US011250142B1

(12) United States Patent
Wu et al.

(10) Patent No.: US 11,250,142 B1
(45) Date of Patent: Feb. 15, 2022

(54) SYSTEM AND METHOD FOR PROTECTING DATA IN BUSINESS TRANSACTIONS

(71) Applicants: Jianqing Wu, Beltsville, MD (US); Ping Zha, Beltsville, MD (US)

(72) Inventors: Jianqing Wu, Beltsville, MD (US); Ping Zha, Beltsville, MD (US)

(*) Notice: Subject to any disclaimer, the term of this patent is extended or adjusted under 35 U.S.C. 154(b) by 325 days.

(21) Appl. No.: 16/560,835

(22) Filed: Sep. 4, 2019

Related U.S. Application Data

(60) Provisional application No. 62/727,506, filed on Sep. 5, 2018.

(51) Int. Cl.

| | | |
|---|---|---|
| *G06F 21/60* | (2013.01) | |
| *G06Q 20/40* | (2012.01) | |
| *G06F 21/62* | (2013.01) | |
| *G06Q 20/38* | (2012.01) | |
| *G06F 9/451* | (2018.01) | |
| *H04L 9/08* | (2006.01) | |
| *H04L 9/12* | (2006.01) | |

(52) U.S. Cl.
CPC ............ *G06F 21/602* (2013.01); *G06F 9/451* (2018.02); *G06F 21/6245* (2013.01); *G06Q 20/3829* (2013.01); *H04L 9/0819* (2013.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 9,781,108 B2* | 10/2017 | Pizano | .................... | H04L 9/321 |
| 2008/0133419 A1* | 6/2008 | Wormington | .......... | G06Q 20/12 |
| | | | | 705/64 |
| 2008/0195551 A1* | 8/2008 | McIsaac | .............. | G06Q 20/401 |
| | | | | 705/75 |

(Continued)

FOREIGN PATENT DOCUMENTS

EP          0500245 A2 *   8/1992   .......... G06Q 20/367

OTHER PUBLICATIONS

Enhanced Security for Cloud Storage using File Encryption. Mukhopadhyay. (Year: 2013).*

(Continued)

*Primary Examiner* — Venkat Perungavoor
(74) *Attorney, Agent, or Firm* — Jianqing Wu

(57) ABSTRACT

A system and method for securely protecting consumer's or user data that is stored on servers or computers controlled by another person/entity is disclosed. The user's sensitive data is encrypted by using a user-provided encryption key and saved on the server. Each time in conducting a business transaction, the user provides an encryption key and causes the encrypted user's data to be decrypted on a server or a client computer. The resulted usable user data is then used in conducting business transactions such as making payment, making bank transactions, managing credit reports, medical records, and personal information, conducting multiple-party business transactions, doing computation services, etc. The encryption of stored data by using different private keys will remove the incentive to hack the whole database and thus create an ecosystem discouraging repeated mass data breaches.

20 Claims, 11 Drawing Sheets

(56) References Cited

U.S. PATENT DOCUMENTS

| | | | | |
|---|---|---|---|---|
| 2009/0198617 A1* | 8/2009 | Soghoian | ............... | G07F 9/001 |
| | | | | 705/65 |
| 2010/0043061 A1* | 2/2010 | Martin | ............... | G06Q 20/3574 |
| | | | | 726/4 |
| 2017/0200155 A1* | 7/2017 | Fourez | ............... | G06Q 20/385 |
| 2018/0198688 A1* | 7/2018 | Dawes | ............... | G06F 3/0488 |
| 2019/0349755 A1* | 11/2019 | Maia | ............... | H04W 12/06 |

OTHER PUBLICATIONS

Holistic Security Model for Mobile Database in Nigeria. Obodoeze. AJER. (Year: 2016).*
OmniShare: Securely Accessing Encrypted Cloud Storage from Multiple Authorized Devices. Paverd. (Year: 2016).*
Secure Sensitive Data Sharing on a Big Data Platform. Dong. (Year: 2015).*
CN 112002385A . English Translation. (Year: 2020).*
KR 2001044263 A. English Translation. (Year: 2001).*

* cited by examiner

Upload Payment Data for a XXX account

1. Enter Card Information:

Card Name | DC810
Card No: | (Your card No)
Exp Date: | (Expiration date)
Billing add: | (Your billing address)

— 301

2. Select an encryption key:

(Your private key) — 302

Provide a hint as a reminder

— 303

⦿ Encrypt individual fields   ◯ Encrypt as one unit.

[Submit]   [Clear Form]

FIG. 3A

Authorize a scheduled payment transaction

Per our arrangement, you are required to provide an encryption key in order to make following payment:

**Electrical bill for May 2018 for Edison Inc.
Using Credit Card: GoldCard08**

⦿ (Your key) ← 304

Your hint for the key: 3G mountain

○ Cookie ▼ ← 305

☒ Pay this amount: 50.00 ← 306

[Submit]  [Clear Form]

Confirmation of a Payment Transaction

You have made the following transaction successfully:

| | |
|---|---|
| Type transaction: | Electrical bill for May 2018 |
| Payee: | Edison Inc |
| Amount: | $50.00 |
| Date: | June 28, 2018 |
| Confirmation No: | XYZ125000 |
| Next Payment: | Request arrives on July 30, 2019 |

← 307

[Close]  [Print]

FIG. 3C

USER DATA SUMMARY TABLE
401

User data controlled by user's encryption keys

| Rec. No. | Description | Use | Size (K) | Uploading Date/Time | Encryption | Actions |
|---|---|---|---|---|---|---|
| 0000-0001 | Identity data | Yearly | 199.5 | 04/10/2017 14:10:12 | Encrypted (Details) | View data / New key / Update |
| 0000-0002 | Credit cd 898 | Month-ly | 40.5 | 09/13/2017 05:45:13 | Encrypted (Details) | View data / New key / Update |
| 0000-0003 | Bank payment GD | Spare | 48.5 | 04/15/2017 12:00:24 | Encrypted (Details) | View data / New key / Update |

10 Records | 1 ▼ of 1 pages | 3 ▼ Per Page | First | Back | Next | Last

Detailed User's or Owner's Data

1. Name of the User Data:

Credit card *898 for paying gas bill:

2. Encryption Method: [ Change ] ← 402

Algorithm: AES128B

Owner Key: single key

Data Format: Card No, expiration date and address
    In one delimited string

403

[ View Data ] [ Change Key ] [ Update Data ] [ Delete Data ]

[ Close ]

FIG. 4B

Select Personal Key Providers for the Group or Project

You may select any one to all of users for controlling group files, however, too many keys may increase risk of complication.

- ☒ Jack Li, jack@AOL.com
- ☐ Lisa Young, LY@verizon.com ← 801
- ☒ Smith Lee, S.Lee@yahoo.com
- ☐ Pete Noble, Peter@gmail.com

[Submit]  [Clear Form]

Select an Encryption Key Control Method for A Group or Project

You may select any one of the following methods (using a single encryption key):

- ⦿ Include the key in each request sent to the server
- ○ Save it in Session for each individual connection
- ○ Save it on a "Session" declared for the group or project
- ○ Save a submitted key on designated volatile memory

802

[Submit]  [Clear Form]

FIG. 8B

Enter Multiple Keys for A Group or Project

Provide personal keys according to a setup scheme.

⦿ Manual entry

Key 1: Maintained by Jack Li, jack@AOL.com

[XYZ987]

803

Key 2: Maintained by Smith Lee, S.Lee@yahoo.com

[ABC123]

○ Read a file: [USB drive: ▼]  804

[Submit]  [Clear Form]

FIG. 8C

SYSTEM AND METHOD FOR PROTECTING DATA IN BUSINESS TRANSACTIONS

CROSS REFERENCE TO RELATED APPLICATIONS

This application is related to and claims priority on Provision Application Ser. No. 62/727,506, titled "System and Method for Protecting Owner Data in Business Environments," filed on Sep. 5, 2018 by Jianqing Wu and Ping Zha.

FIELD OF THE INVENTION

The present invention generally relates to system and method for managing consumer's data or user's data in business environments, and particularly to system and method for managing user's data that is shared, used, or accessed by persons that the consumers or users have no control.

BACKGROUND OF THE INVENTION

Since the arrival of the computer age, consumer data has been widely used by merchants (including vendors, stores, utilities companies, government agency, organizations, schools and universities, etc.) that conduct business in the internet. A large number of systems and methods have been developed to protect consumer data. Despite the large number of inventions as reflected in the U.S. patents, consumer data breaches have happened in fairly high frequencies.

The Wikipedia shows a list of 251 well known data breaches for those involving the theft or compromise of 30,000 or more records and those involving large corporations. One of the common scenes is hacking password database for accessing a large number of accounts. The list of data breaches include: the 2012 Apple Blue Toad breach affect 12,367,232 records; the 2014 AOL inside-assisted hack: 92 million; Anthem Inc. 2015: 80 millions; Adobe Systems 2013: 152 millions; Bank of America 2005: 1.2 million; CardSystem Solutions 2005: 40 million; CVS 2015: several million; Data Process International 2008: 8 million; eBay 2014: 145 millions; Equifax 2017: 143 million; Blue-Cross BlueShield 2015: 10 million; FaceBook 2013: 6 million; Gmail 2014: 5 million; Heartland 2009: 130 million; Home Depot 2014: 56 million; JP Morgan Chase 2014: 76 million; Massive Hack 2012: 160 million; Veterans Data 2009: 76 million; Yahoo 2013: 3 billion; Dropbox 2012: 68 million; and linkedin 2012: 6.5 million.

It has been estimated that mega data breaches cost $40 million to $350 million and that the average cost of a data breach is $3.86 million. The average cost for each lost or stolen record containing sensitive information is about $148 for 2018.

Most small data breaches would probably not attract attention from media. The actual number of breaches is magnitudes more. Actual involved data records would be many folds more than the total number of reported compromised data records. Thieves are caught only at low frequencies.

It is estimated that the total damage caused by data breaches is between $375 and $575 billion annually. This number is expected to grow as online information stealing expands with increased Internet use. It is estimated that the average cost of a data breach will be over $150 million by 2020, with the global annual cost forecast to be $2.1 trillion.

Medical data has become the hottest subjects for hackers. Medical records normally contain patient names, birth days, insurance policy numbers, disease diagnosis, and billing information. In some cases, social security number is also included. Medical data sold on the dark web is four times as valuable as a social security number ($60 or more), and the number of health care hacks has skyrocketed. Due to relative small batch numbers, most breaches are not reported.

Medical information can be used to create fake identities that are necessary for buying and reselling medical equipment or drugs, filing fake claims with insurers, and filing fake tax returns. Hackers occasionally use stolen medical records for extortion, forcing hospitals to pay to keep hackers quiet.

Internet data security is the hottest area of research. In the U.S. along, there are thousands of patents on internet security. There is no sign that internet security is improved. Internet security was like cancer that has failed consumers for decades.

The internet data security failure is rooted in the incentive of business entities of creating the most favorable ecosystem for doing business. The huge number of patent applications filed with the U.S. patent office reflects the same thinking. All security methods are intended to be uniformly applied to a huge number of user accounts.

The mass data placed on information highway creates a great incentive for constant attacks. All new solutions are merely improved account authentication methods, use of two or more factors in authenticating users, and increased password length, and increased strength of encryption. None of those measures has been successful. Each new or improved method is quickly be cracked. History is repeated.

The failure of the internet security can be traced to the trusted systems model. The early data security model focuses on the server as the protection focus. Based on this presumption, a server can be secured or trusted completely, internet data security can be realized by merely enforcing policies in three main aspects: identification of users, authentication of user, and auditing of user activities. It has never worked against insider-assisting attacks.

This internet security model cannot provide real data security in many business transaction environments. In most business environments, the user data must be shared, used, or accessed by a server, which is run by a large number of employees. The past focus of data protection is not data of consumers, but the business data of the merchants. Owners of businesses have a strong interest in protecting their business data. The users of the server, the employees of the server, and owners of the business have different interests.

Moreover, the data security model is clearly in conflict with the notion of keeping data privacy. When two parties share the same secrets, nothing can be kept as secrets. This means that the idea of protecting others' data must fail as long the incentive for getting the data is sufficiently high.

Among the known data breaches and a larger number of unreported data breaches, common causes are accidents, mistakes and hacking. A common scene is that a huge number of user accounts on a server or data center is stolen. The history of data breaches is conclusively proof the current security approach is not working.

Transmission encryption cannot effectively prevent various kinds of attacks. Transport layer security and the public key infrastructure can be easily cracked. See "Keyjacking: the surprising insecurity of client-side SSL, John Marchesini et al., Computers & Security (2004). This article concluded by stating "we demonstrate via a series of experiments that this assumption does not hold with standard desktop tools, even if the browser user does all the right things. A fundamental rethinking of the trust, usage, and storage model might result in more effective tools for achieving the PKI vision."

In existing business systems, data is stored in plain text or ciphertext that is created by using a password or key that can be found in the system. The password can be hacked. Even if the password is stored in a hashed form, it is still possible to reverse the hash to get the original passwords. Thus, as long as a security measure is based on an account password or system password, such a system must be vulnerable.

In many data storage systems, encryption keys are derived from shared passwords. All passwords are kept in a database table. If a hacker gets this table, the hacker can reverse all hashed passwords to real passwords and thus the encryption key for all accounts. Therefore, the hacker can get not only login names, but also the encryption key for decrypting stored data. Therefore, this encryption method is not safe. Any system that uses account passwords directly or indirectly as encryption keys is not secure.

A model method for encrypting database field data is encrypted in similar way. The encryption key is used to encrypt and decrypt data. The encryption key is created by using a secret key that is derived from the user password and then saved in the database together with data. To crack this database, the hacker needs to get the password database, learn how the secret key is created from the password, and where the encrypted data is stored. When a hacker figures out how to use the password to generate the secret key, how to use the secret key to generate the encryption key, the hacker can decrypt acquired user data.

Multiple factor verification methods are ineffective in stopping insider-assisted data breaches. The massive number of new methods such as using fingerprints, personal picture, biological markings, etc. will not improve data security by any meaningful way, but only add insult to injury.

The public does not have confidence in data security measures that are based on joint efforts of multiple-parties. While such an arrangement can provide good protection against law-abiding people, it cannot prevent unlawful access for many reasons. First, the biggest risk comes from the insiders who know the security features of the data system. When a hacker is interested in acquiring data from a target user, the hacker can approach employees knowing the target. Internal policies and laws will not stop such contact. If the data sought has a huge economic value, no private agreement can stop commercial espionage and conspiracy.

Second, the entire internet infrastructure is vulnerable. For example, information transmitting on the Internet can be intercepted by middlemen, and passwords and encryption keys can be jacked in transmission; the whole database can be dumped and taken by an insider; the server software can be tampered to engage in unauthorized activities; and spyware and virus can be installed secretly on client computers to get data, encryption keys, and passwords; and even the server itself can be tampered to capture information in memory.

Multiple-party security arrangements are useful only in very limited situation. They not only fail to prevent target attacks, but increase data vulnerability. If a website has been identified as the attack target, little can be done to stop it. Third party employees, the identities of targeted persons or entities, published information concerning web sites, and detailed arrangements would serve as useful leads for the hacker to use in making a hacking plan.

All multiple-party security arrangements are vulnerable to abusive legal process. A super majority of secure systems are developed on the basis of a flawed assumption that all people on the Internet play their games by rules, and thus trust can be established. Those systems can only stop law-abiding people from committing unlawful acts. Hackers can use any unlawful means, including intercepting messages, bribing employees, soliciting secrets from third parties, and abusing legal process. A person can file a lawsuit against another person to gain subpoena right. By the time the case is dismissed, the person might have acquired wanted sensitive data.

The use of personal biological identity information will only compound more risks in the future. First, biological identity data can be easily acquired by taking blood samples, hairs, and photos. Thus, proving identity by using biological data is less reliable than using a secret key which can be hidden from the world. Second, if personal identifies database containing fingerprints, facial looks, iris profiles, DNA profiles, etc. is stolen, it is the worst nightmare. The thieves acquiring massive identity data can impersonate thousands to millions of people, while the effected people cannot change their personal identities. The long history of consistent failure of protecting consumer data is conclusive proof that all currently used data protection models are fundamentally flawed.

When incentive is too high, data security cannot achieved by relying upon rules and laws, corporate practices, moral standards, private contracts, criminal sanctions, trusted hardware components, trusted software components, trusted third parties, and trusted employees. Data on the public cloud must be treated as intelligence information sought by hostile entities, competitors and hackers.

Each new security method can delay attacks. After the new security method is known, studied and cracked, consumer data will be taken in the same or at even a larger scale. Prior art has consistently focused on finding a single data storage method. It is imagined that a strong protective method can solve the problem instantly. This approach has never worked and will never work. When a new method is found, used and tried, the method is known, studied, and cracked. History repeats itself.

Therefore, there is a need to find a completely different methodology for safe-protecting consumer data or user data. A new and successful method cannot rely upon the current thinking and practices. It must drastically depart from whatever the industry has done so far.

Therefore, there is a need to study the inventive of hackers and find solutions that will dramatically reduce the incentive to hack.

Therefore, there is a need to develop diversified data security model for changing the data storage ecosystem. Most importantly, a secured internet can be established only by changing the internet security ecosystem. By changing internet ecosystem, hacking will become a business with insufficient rewards, hacks will slowly and naturally disappear.

INCORPORATION BY REFERENCE

The following references and their disclosures are incorporated herein by reference in their entirety:

U.S. Pat. No. 9,449,183, issued Sep. 20, 2016, titled SECURE FILE DRAWER AND SAFE, by Jianiqng Wu.

U.S. Pat. No. 7,051,002, issued May 23, 2006, titled UNIVERSAL MERCHANT PLATFORM FOR PAYMENT AUTHENTICATION, by Michael Keresman, Francis Sherwin, and Chandra Balasubramanian.

U.S. Pat. No. 5,715,314A, issued Feb. 3, 1998, titled NETWORKSALES SYSTEM, by Andrew C. Payne, Lawrence C. Stewart, and David J. Mackie (the originally named inventors).

Since this invention is intended to change the ECOSYSTEM of business transactions/activities using consumer's data (also known as user data or owner data in this disclosure), it is intended to improve any of the existing systems, where user's data is permanently stored on a computer that is controlled by a merchant or any kinds of entity for its benefits. Thus, such existing systems are also incorporated by implication to the extent they are used as the support for claimed inventions and equivalents.

SUMMARY OF THE INVENTION

The present invention is a system and method for securely keeping user data on a server for the convenience of a business. The information is used in a trusted business relationship where the business entity must use the information at least in one or more instances. User data is stored on the server in ciphertext that has been created by using a user-provided encryption key.

When the need to use the user data arises, the server sends a request for the consumer to provide an encryption key for decrypting the user data. Such a request may be sent to the data owner by an email with an embedded link or by other means such as phone calls, faxes, and instant messages. The obligations of both parties may be provided by contractual terms, understanding, regulations and/or laws.

Upon the user request for processing the intended transaction or upon clicking a link sent from email, the system, which may be the same server or a related server, generates a transaction-authorization page for the user. This page contains unique information for identifying the user and the transaction to be processed. The user types in the encryption key or selects an option for browsing the client computer to get an encryption key stored on the client computer, and submits the page to the server. Upon processing the request, the server gets the encryption key, and then retrieves encrypted user data from the server, decrypts the data using the key to result in usable data.

The server uses the usable data to conduct an intended transaction. If the data is for only review, the data is used for the period of review. Upon the review is complete, the usable data is deleted permanently. If the data is necessary to generate paper for circulation, it may be done so. After the review is completely, the usable data is not stored on the server and all temporary data is deleted.

If the intended translation is only for one time use, the server will use it once. If the intended translation is to process a payment by using the existing method, the server will use the data such as a stored credit card number, user address, and credit card expiration date, etc. to process the payment. Upon completing the payment, the server will delete or discard the usable data without saving them on the server.

User data includes important personal identity data such as birth day, social security, biological identity information such as fingerprints, blood types. DNA profiles, medical records, personal working histories, school records, working experience, and anything that a person may be interested in preventing the world from knowing. The data may be the type that concerns personal financial standing and financial liabilities such as banking information, credit card information, income source information, etc.

The types of transactions that requires the use of encrypted user data include payment, computation, contract renewal, renewal of household contracts, renewal of insurance, application to schools, job application, personal information for relationship web sites, group editing of the documents, documents review by a group of people, documents processing by a group of people, and anything that would require any kind of personal sensitive data.

In another situation, user data may be stored on a serer for use by another business partner. The data from a consumer is stored on a server for use by a third party business partner who does not control the server.

In yet another situation, user data may be stored on a server, but also shared among a plurality of other persons in the internet. The data might be stored on personal computers, the clouds, or shared drives. The user data may be subject to edits and changes. In another example, user data may be stored on a server to be shared among a group of people such as employees of a company, members of a family, and members of a club or a group.

In another situation, user data may be stored on a server for an unspecified time, but must be used by the server in rendering required services or used by another connected server in providing its services. Exemplar services include computation services, problem-solving services, and digital data processing services.

In each of those situations, data is owned by a person, who might be a consumers, an internet service user, or public member, there is preference to store the data on the server, and the data must be accessed by another person, the server, another server, or another computer system, or any combination thereof.

BRIEF DESCRIPTION OF DRAWINGS

FIG. 3A shows an exemplar user interface for uploading payment data together with an encryption key to the server.

FIG. 3B shows an exemplar user interface for prompting a user to provide an encryption key in conducting a business transaction.

FIG. 3C shows a confirmation message that a business transaction has been conducted successfully.

FIG. 4A shows an exemplar user interface for viewing all user-key encrypted data stored on the server.

FIG. 4B shows an exemplar Data Details Page for showing encrypted user data.

FIG. 8B shows a user interface for designating how the encryption key is managed.

FIG. 8C shows a user interface for entering at least two personal keys that are used to generate an encryption key for encrypting and decrypting group data.

DETAILED DESCRIPTION OF INVENTION

Figures 1, 2:
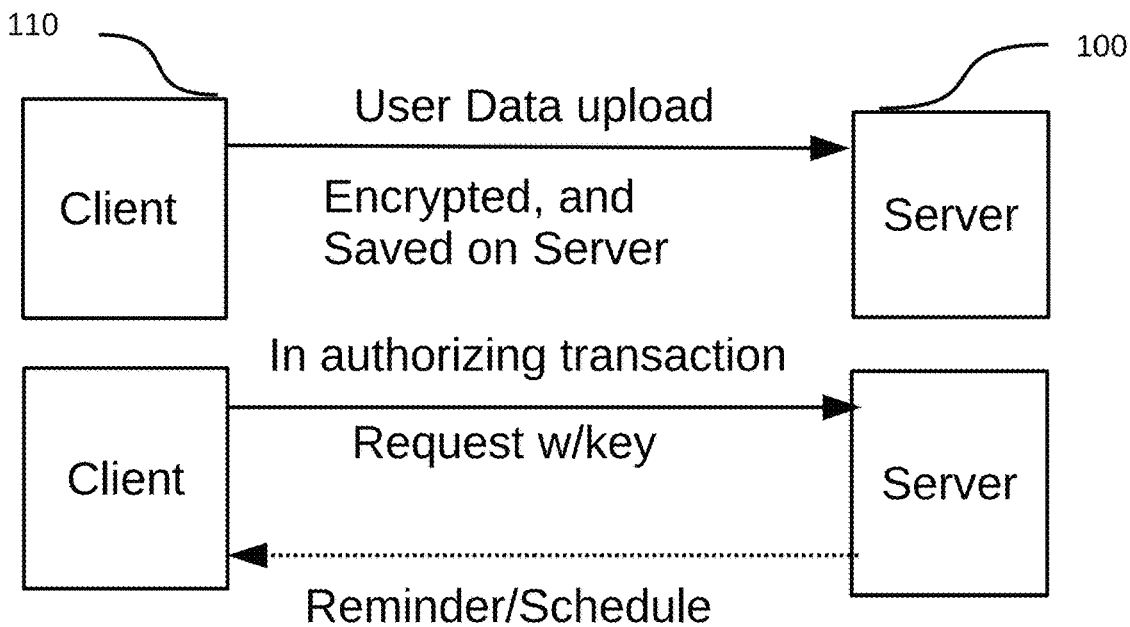
FIG. 1 shows a hybrid system model that combines a data storage model with the business transaction model.
FIG. 2 shows the user interface for setting up optional encryption features for a server or an account on the server.

The terms defined in the following sub section are used in interpreting Specification and the appendant claims.

A. Terms

"Usable data" means that the data exists in a form that can be used for intended purpose. Data may include any kind of digital data including text field data, files and documents, word-processor files, image files, video files, sound files, and any digital data that is capable of being transmitted in the Internet and can be processed by Central Process Unit of a computer. For example, a document can be opened, read and edited by a person.

A video file can be played to show pictures; a sound file can be played to produce sound, a database data can be understood by a server program and can be reviewed by user. A setup file, configuration file, etc. that can be used by a computer program to execute intended functions is also in usable form. In contrast, when data is encrypted, it is not in a usable form. Encrypted data is not usable data.

Owner or user means a person or a legal entity that owns, creates, edits, controls, or possesses data which is the subject of protection. Owner or user may be an authorized agent, a representative of the true legal owner, or an authorized user of a group that own the data. When multiple persons assume the roles of owners, the one who is closet to the owner in interest, control and business relationship will be referred to as the owner, but persons who are more remote to the user may be referred as users.

User data includes all kinds of data of the user. It can have following types:

(1) Data that is used in daily communication, such as name, phone number, email address, and home address. Some individual data items may be available in the public, but their combination can be used to harm the user. Moreover, the user may demand that any special data pieces be protected for special purposes;

(2) Data that might be used in occasional situations or is associated with a person. This class of data includes any data concerning the user. The data may be used once or on rare occasions. The data can be encrypted and stored in an encrypted form without hindering a required business transaction. Such data may be useful for determining user identities, dispute resolutions, etc. The data is not useful in conducting routine business transactions;

(3) Data that is used in routine business transactions. This type of data includes payment information such as credit card number, expiration date, and billing address. This type of data is stored on the server so that the business can periodically use it for the merchant benefits. Similar data includes banking account, paypal email address, and insurance information. The data often comes with personal identity data. When a business transaction needs to be done, all related data may be treated as the same type of data; and (4) Data that reflects personal views, political view, daily activities, business dealings, income, personal characters and reputation, and things that the user would like to protect. There is no formality requirement.

B. Chancing the Internet's Ecosystem

All known security methods, including password authentication method, multiple-factor authentication, and biological material authentication methods cannot ineffectively prevent insider-assisting attacks.

To stop widespread data breaches, it is necessary to change the internet ecosystem. A secure internet ecosystem must provide low reward incentive, lowest ratio between usable data and unusable data in storage time, shortest data vulnerable time, and highest entropy.

Encrypting user data by using a user-provided key would be the an effective way to prevent hacking. However, this arrangement alters the convention that the business has a total control over the user data.

It is also important to further improve data transmission security by the following methods: (1) Eliminating all unnecessary middlemen from the security measure; (2) using the best security methods for improving data transport layer security; (3) reducing data vulnerable residency time on the server to the minimum; and (4) using diverse encryption algorithms, key-stretching methods, and different keys to increase data transmission security.

C. Changes in Rights and Obligations

The only way for achieving data security is that the user data is controlled by the user and the encryption key is known only to the user or owner. Unfortunately, user data encrypted in this way cannot be used by other persons or merchants. Thus, the invention is based on the concept that merchants are allowed to access user data only in a small time windows per special agreements. To make this system workable, the rights and obligations on managing user data must be modified by agreements, common understandings, user-regulations, trade regulations, statutes, state laws, local laws, etc.

(a) The merchant, which is any entity that uses another person's data, may use data of another person only when there is a need. The need for using such data may be provided by contractual terms, governmental regulation, laws and statutes, customs, trade regulations, or any other suitable rules such companies policies, club regulations, and even general understanding after a new culture for restrictive use of others' data has formed.

(b) The user data or at least some of it must be stored in ciphertext that has been created by performing encryption by using user-provided keys and is permanently stored in such a form without saving the key on the server.

(c) User data that is needed only for one-time use is preferably deleted, and not saved on the server. Such data may be stored for a period of time until the need no longer exists and should be deleted per contractual or legal obligations.

(d) User data that is stored in ciphertext permanently on the server can be decrypted to produce usable form data, and the usable form of user data may be saved on the server for a limited time or just sufficiently long time for completing an intended business transaction.

(e) The user is obligated to provide an encryption key to decrypt stored data whenever the user is required to conduct a normal business transaction per their agreements or understanding.

D. Hardware and Software Components

FIG. 3A shows that the system of the present invention comprises a server 100 and a client computer 110, all of which are connected in a network so that they are able to exchange data using a common data transmitting protocol such as TCP. Each of the client computers is able to access the server using WWW protocol and access the web pages sent by the server according to any of the current standard HTTP protocols (0.9, 1.0, 1.1, 2.0, etc). Optionally, a database application is used for managing user accounts and for storing data and files. For a small system, Perl database may be used as an alternative. Data and files may be stored in a database table or as files in folders.

The server 110 means any of a plurality of computers or physical servers, virtual servers, or computers or servers in a network for the merchant. They may optionally include machines that can manage telephone calls, send and receive data, handle emails. They may include other hardware components that are specifically discussed in the Specification, implied in referenced business transactions, referenced in relevant prior arts, and originally mentioned in the claims. Those computers, servers, or machines may be located in the same container, in separate containers, or as separate servers connected by a network or the internet. The subjects of this invention is modifying user data from an accessible form to user-key-encrypted unusable form, a method of creating such data, and an additional method of authorizing the merchant machine to decrypt the encrypted user data for each use. When the present invention is used on different systems, the complete system naturally include those remaining components of the existing system. Other components may include a payment processing computer or a payment gateway, a telephone payment system, an email server in a network or the internet, a central computer, bankcard network/automatic clearing house, etc.

Since those modifications are made on the merchant system, detailed discussion will be revolved around the merchant system. In a payment system, the merchant must use a gateway, a payment processor, or a central computer connected to a bankcard network or automatic clearing house. The payment gateway authorizes a payment by forwarding readable payment information and effectuates the payment by causing the credit card issuing bank to transfer a required amount of fund to the merchant account in the acquiring bank, or forwards the payment request to the issuing bank which verifies the credit and authorizes payment to the merchant's account of the acquiring bank.

The software developed for practicing this invention includes the server-application and the code for controlling the client computer. The main components of the system include account managing component, data uploading component, data downloading component, encrypting and decrypting components, and data verification component. Some optional components include access-controlling component, data transforming component, data parsing component, email notification component and all of those components referenced in those expressly incorporated patents and those patents incorporated by implication. Solely for convenience of disclosure, all software components that jointly perform a well-defined function may be referred to as a component.

E. Creating User-Key Encrypted Data

FIG. 1 shows the process for creating user-encrypted data for a user by the server. As shown in FIG. 1, user data is first uploaded to the server 100, with an optional step of validating the data, and saved on the server 100. In conducting a business transaction, the user on the client computer 110 makes a request including an encryption key to authorize the server to conduct a scheduled transaction. The server 100 uses the included key to decrypt saved user data, and then uses the resulted usable data in conducting the transaction according the prior art method. Other computers or servers need for processing the business transactions are not shown in FIG. 1.

1. User-Key Encrypted Data

FIG. 4A shows a user interface showing "User Data Summary Table." ("user" and "owner" are used interchangeably). This table shows user-key-encrypted data. After the user logs into the account on the server, the user can see the table. The page contains one or more data entries. A data record No. or name may be used to identify the data. Each no, or name (as shown in Block 401) may be a link or button for opening Data Details page for that data record. Each of the data has action links: "View Data", "Update Data" and "Change Key." Some exemplar operational steps are shown in FIGS. 5C-5E and discussed in related description. A "Deletion" link may be placed on this table for the user in some business contexts, but is available to the server employees.

The table shows data by a number, description, size, uploading date and time, encryption method and actions. The user data might be a single field data piece, multiple fields data, text file, sound file, video file, a native file for application, or any combination of thereof as long as it can be used to conduct the business transaction. Different types of data may be combined for convenience of doing business transactions. The column headings have the following meanings:

"No." means serial numbers generated automatically by the server for each data record.

"Description" means a description of each of the data for identification purpose. Examples are "credit card 499", "bank account no," "Green Oak contract" "personal medical record" "tax information" "property assessment data." What kinds of data are listed would depend upon business relationship between the user and the person/entity that owns and runs the server.

"Uploading Date/Time" means the uploading dates and times that the data is uploaded and saved. They cannot be changed, but can be replaced by new date and time.

"Size" means the size of data. This is optional parameter that can help the user know the size. It is the size of encrypted data if the data is stored in one single piece. It shows the total size of a plurality data pieces that are encrypted collectively. It is the size of the encrypted file if a record is for a file.

"Encryption" means the encryption methods used for the associated data. If multiple encryption algorithms are available, this field should contain sufficient information to identify each used encryption algorithm.

"Status" may optionally be used to indicate the statuses of the data. One status include original, updated and new for a data record. It may be used to indicate verification status such as verified, unverified, and corrupted. An unverified status means that the data record has not been verified, and the user may verify it later. If a data item or any field of a composite data is found unusable, the data is marked as "bad."

Encrypted user's data can be accessed by clicking links or buttons that may be placed on the User Data Summary Table, a Data Details page, or other view arrangements. Each of the data records on a table is associated with a link or button of "Decrypt" while usable data records may be downloaded by using a "Download" button (not shown).

The method for creating encrypted user data can be applied to all embodiments discussed below. The differences in managing encryption keys, using data, and business transactions will be discussed in each of specific embodiments.

2. User Data Formats

User data may be processed and encrypted in any of various formats: encrypted single piece of data, a plurality of separately encrypted data pieces, an encrypted data object comprising multiple data pieces separated by delimiter, encrypted text file, encrypted native file, encrypted web page, encrypted plural web pages in a folder, encrypted zip file which may contain folder and sub folders, encrypted video file, encrypted audio file, encrypted database file (records, whole or partial table, or whole or partial database), encrypted native file for applications.

Credit card data includes credit card account number, expiration date, and payer address. Those data fields may be encrypted individually. For example, an encrypted data may look like: NameOnCard: Xv asQry S CardNumber: 9872344353492934 ExpirationDate: hdides. Any suitable format can work. In an alternative, the individual data pieces are first appended to form a single string containing proper delimiters, encrypted using a user-provided key, and stored on the server. In using it, the server first uses the user's key to decrypt the data, breaks up the data at delimiter points, and gets all individual data pieces for use in processing the business transaction.

User data may be directly created as a web, and then encrypted by using a user-provided key, and stored on the server. Before using the data, the server uses the user-provided key to decrypt the encrypted web page, resulting in a usable web page. The usable web page may be used directly by the server in conducting the intended transaction or after being processed by updating certain data fields such as payment date and amount. The program may be on the same server, run in a different server such as a payment server, a computing server, a design server, a problem-solution server, etc. to process an intended transaction. The usable web page and the encryption key are deleted, discarded by a servlet action, or trashed with the memory being reused by the server.

No matter which data format is used, after the encrypted data is decrypted, the resulted data is directly usable, can be further processed for use, or can be transformed to another usable form. Data transformation such as creating delimited data and breaking delimited data is well known in the art.

3. Data Details and Related Features

Some details may be shown in a "Data Details" page by clicking any data entry number or data name link. Data Details page contains more details that cannot be placed on the Data Summary Table.

Data Details page may contain the basic information such as data record number and description. Other details may include uploading date and time, detailed encryption method, fields of data, file size, verification status, file status together with several operational buttons.

"Encryption details" may optionally contain information on the encryption algorithm, number of personal keys used and the scheme name for constructing the encryption key. This field should provide the user and servers with sufficient information for selecting encryption algorithms and reconstructing encryption keys, but avoid disclosing information that hackers can use.

The page shows more details on uploading date and time, file size, verification status, and other optional features. It shows how the data is structured (data piece, appended data pieces with a delimiter, a compressed or uncompressed zip file, combination of different type of data).

FIG. 4B shows detailed information about a user data entry, "Change" for changing encryption method in Block 402. Some operational links or buttons in Block 403: "View Data" or "Verify Data," "Update Data", "Change Key." It may optionally contain links and buttons for "Delete Data" and "Change Hints", etc.

"View Data" or "Verify Data" is for verifying data condition. It requires the user to provide the encryption key to decrypt the data. It may include a step of checking data field, conducting a test such as a making a test or real payment, conducting a computation, presenting a web page, etc., or prompting the user to inspect data on the client computer.

"Update data" is for the user to change user data, this normally requires a user-provided encryption key unless a key management method is used.

"Change Key" is for the user to change the encryption key. This function requires the user to provide both the old key and a new key.

"Change Hint" may be used to change hint that is presented on this page.

"Delete Data" is for deleting this user data record. This option may appear on the user view, or just for the server employees.

Optionally, additional functions may be placed, allowing the user to choose data fields for encryption. If the user chooses to encrypt a field, the user is prompted to enter an encryption key with an option for entering a hint for this key.

"Active" is used to allow the user to designate a data record as active or inactive. For example, one credit cart is used as active, while other two are entered as spare or inactive.

E. Preferred Embodiments

Several preferred embodiments will be discussed below.

1. Encrypted User Data Used in Automatic Transactions

In this first embodiment, user data is a credit card number, banking account number, together with required data for making a payment. This embodiment includes a method for creating and saving encrypted data on the server, a method for using an encrypted key to process a payment, and the method for confirming the result.

FIG. 2 shows an exemplar user interface for setting up search order for finding the encryption key (Block 201), default encryption key location on the client computer (Block 202), and an optional encryption mark (Block 203), and encryption machine (Block 204). Encryption mark (V-mark) is for convenience of testing if an entered encryption key is good. The setup data is stored on the server (Block 505 in FIG. 5A).

FIG. 3A shows an exemplar user interface for uploading payment data. The user provides credit card data and billing address (Block 301), a user-selected encryption key with an optional hint (Block 302), and method of encryption (Block 303) (any suitable methods may be used). Similar forms can be designed for uploading user data. User data to be encrypted may be any combination of different forms of data. Check boxes may be placed next to each of potential data fields so that the user can select from them the fields to be encrypted.

FIG. 3B shows an exemplar user interface for authorizing a scheduled payment or transaction by using saved encrypted payment data. The user provides an encryption key in Block 304 or selects a method or the key location to get the encryption key (Block 305). Options in the drop-down include file location, search path, search order, cookies, USB drive, smart card device, etc. The client prompts the user to select or browse a specific device or folder upon the user selection of an option in the drop-down 305. On this user interface, the user can also include new data such as new amount in Block 306 to override a default amount of the scheduled payment. The new data may be originally suggested by the server. Obviously, the interface can be modified to allow the user to include other data which can modify, supplement, or overwrite the stored user data. This user interface is used in Block 511 in FIG. 5B and other similar situations.

FIG. 3C shows a confirmation message at Block 307 indicating a successful payment or other transactions.

Figure 5A:
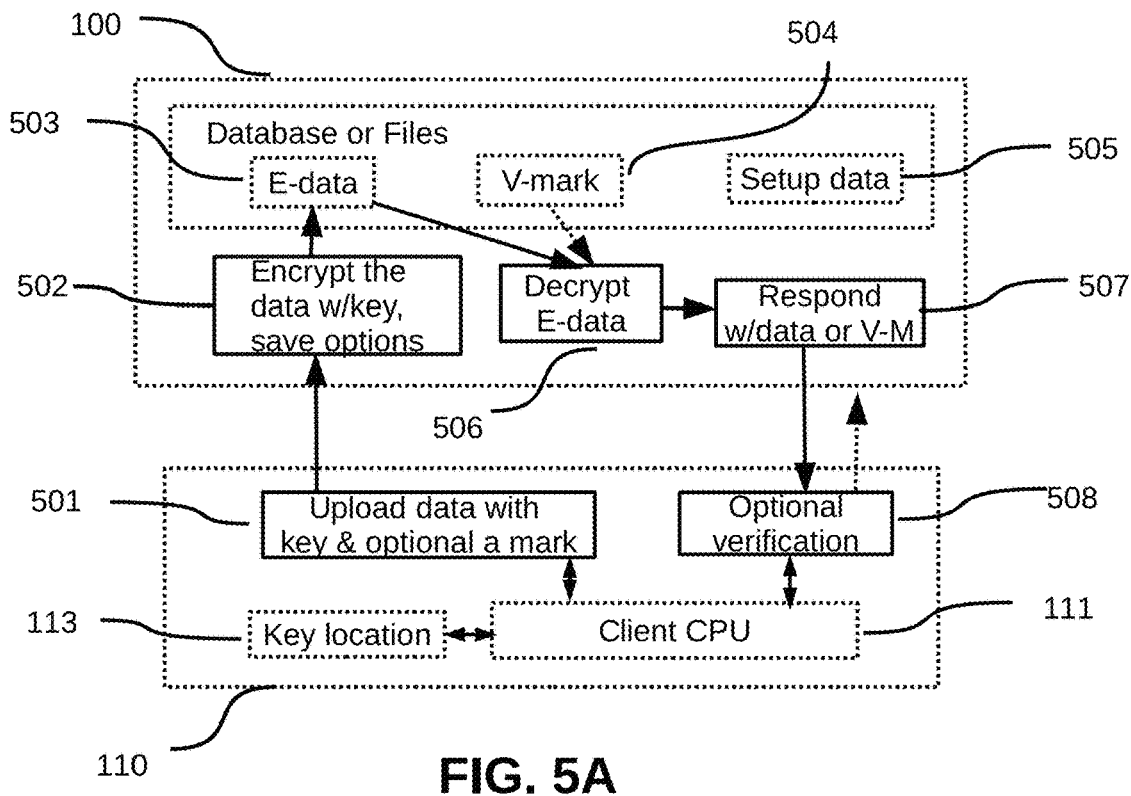
FIG. 5A shows the process for uploading and encrypting user data (owner data) with optional verification.

FIG. 5A shows the process for creating user-key-encrypted payment data. The user on the client computer 110 uploads payment data at Block 501. The user provides payment data, an encryption key, and optionally encryption mark at Block 501. After the data is uploaded, the data is encrypted using the key at Block 502, and saved on the server at Block 503. The server may optionally conduct a decrypt test. The server first gets the encrypted data (referred to as "E-data"), decrypts the E-data at Block 506 to get usable data. The server creates a response with the usable data included in the response at Block 507, and presents the usable data to the user for inspection on the client computer at Block 508. The user ends the process or sends feedback to the server to confirm the result.

The payment data may be encrypted by individual fields or encrypted as one single piece after all field data pieces are combined to form a delimited data. The upload form may allow the user to select a key location at Block 113 (e.g. a path or device) for finding the encryption key. V-mark is an encrypted mark which is produced by encrypting the same mark with account password. The details of using V-mark ("v-m") to test if an encryption key is correct was disclosed in the incorporated U.S. Pat. No. 9,449,183.

Figure 5B:
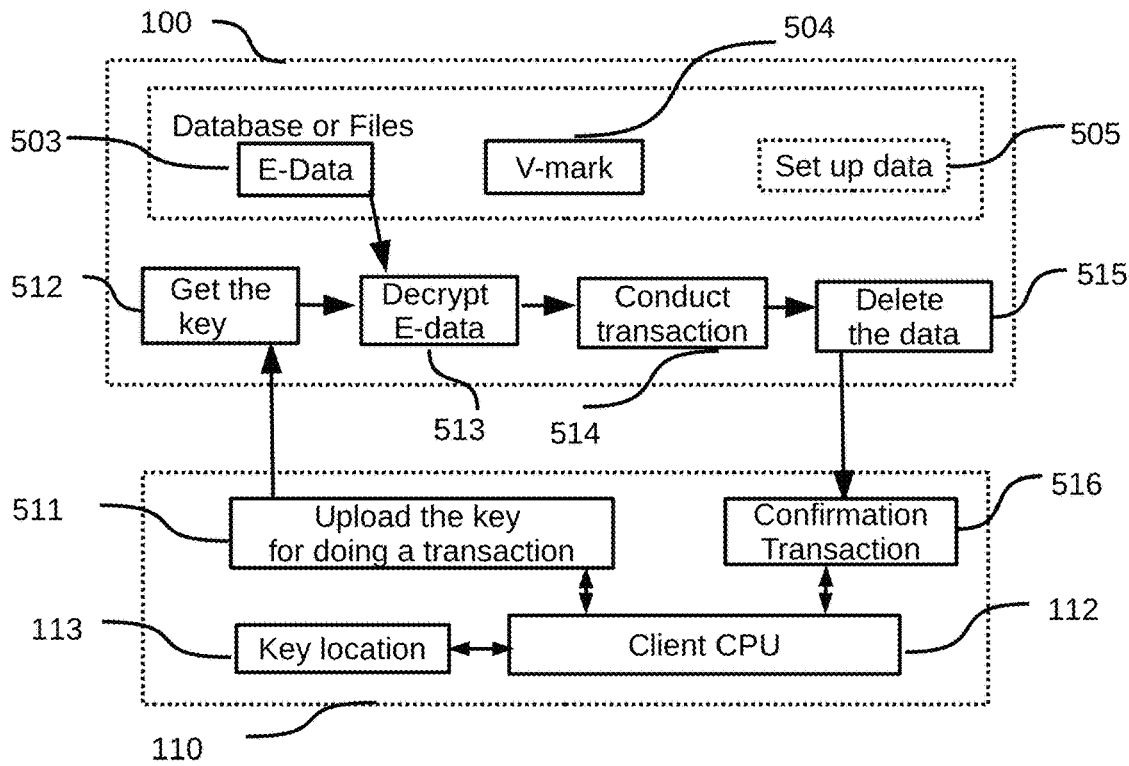
FIG. 5B shows the process for conducting a business transaction using a stored encrypted data.
Figure 5C:
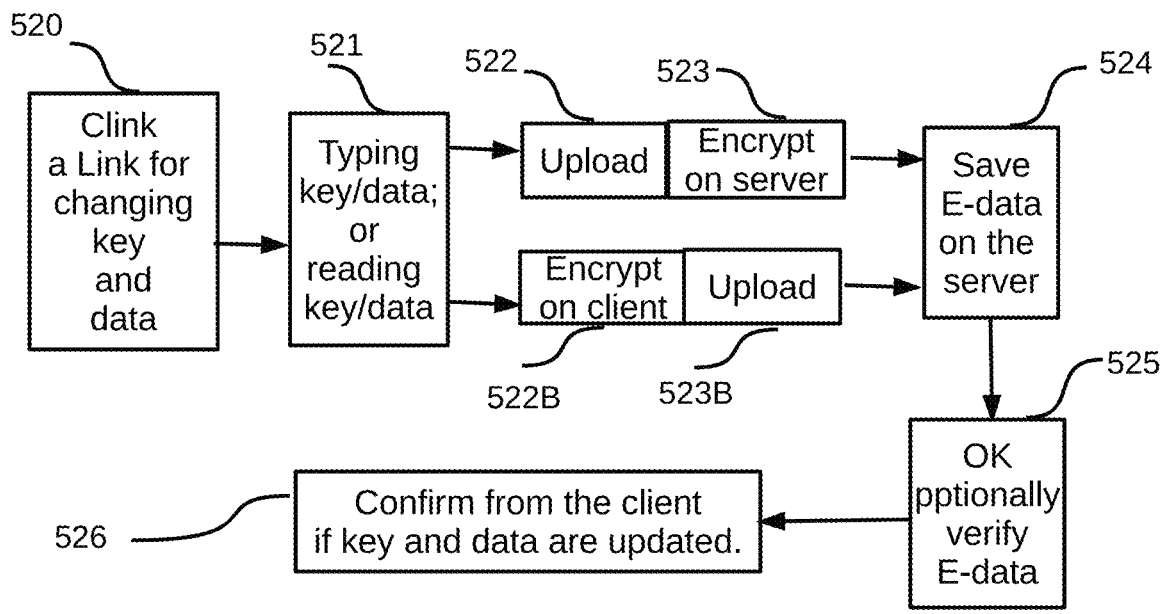
FIG. 5C shows the process for changing both the encryption key and user data or E-data.
Figure 5D:
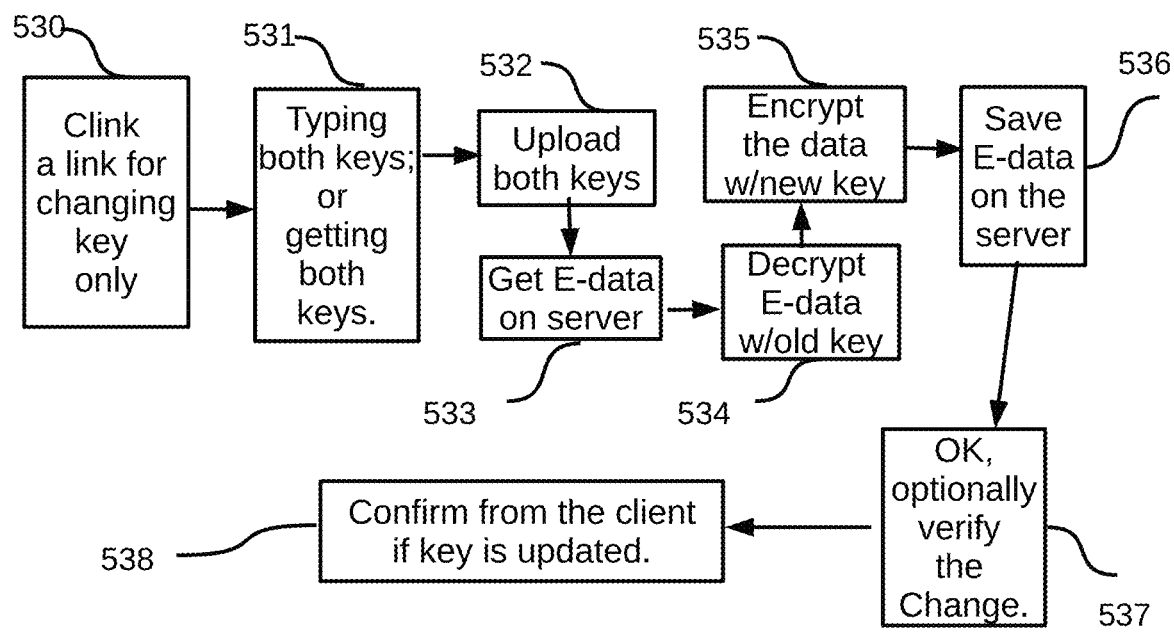
FIG. 5D shows the process for changing the encryption key for stored user data or E-data.
Figure 5E:
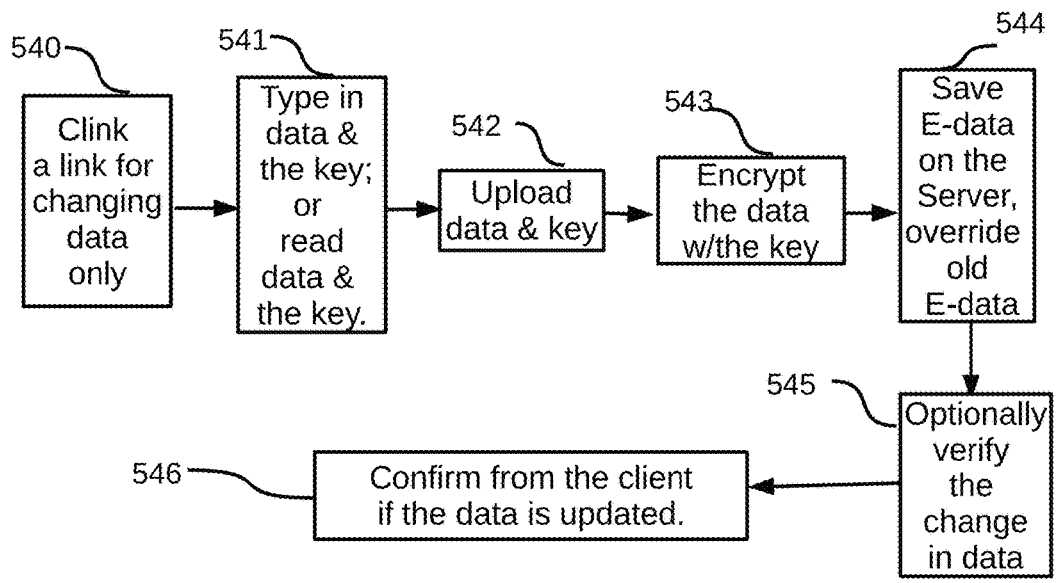
FIG. 5E shows the process for changing user data stored on the server by using a user-provided encryption key.

FIG. 5B shows how a payment is made by using stored encrypted payment data. When the user submits a request including the key at Block 511, the server gets the key at Step 512. The server gets encrypted payment data (E-data) from Block 503, decrypts the payment data at Block 513, resulting in usable data in temporary memory. The server then uses the usable data to conduct a payment transaction at Block 514 (this step include all required steps involving payment gateway or central computer connected to a bank-card network or Automatic Clearance House). Optionally, the server may validate, transform, or process the usable data before the server makes the payment using the usable data. After the payment is made, the server deletes or discard all usable data at Block 515, and sends a confirmation to the client computer at Block at 516.

The data parsing method is consistent with how the field data are created. If data is appended and encrypted as a single piece, the data is decrypted and is then split.

In the page to send the encryption key, the user may designate the key location at Block 113. The setup data 505 contains information on where to find the encryption key by default.

FIG. 5C shows the steps for changing both user data and encryption key. The user clicks a link or button for changing both user data and the key at Block 520, provides new data and a new key, or causes the client to read the data and the key at Block 521. The data and the key are uploaded to the server at Block 522 where the data is encrypted by using the key at Block 523. In the alternative, the data is encrypted by using the key on the client computer at Block 522B and encrypted data is then uploaded to the server at Block 523B. The encrypted data is saved on the server at Block 524 to replace old encrypted data. The server optionally verifies the encrypted data at Block 525 by using the verification process shown in FIG. 5F and finally informs the client computer at Block 526.

FIG. 5D shows the steps for changing the encryption key. The user clicks a link or button for changing the key at Block 530, provides the old key and a new key, or causes the client computer to read both the old and new keys at Block 531. Both the old and new keys are uploaded to the server at Block 532. The server gets the encrypted data associated with this link on the server at Block 533, decrypted the E-data by using the old key resulting in usable data at Block 534. The server then encrypts the usable data by using the new key at Block 535, and saves the encrypted data as replacement E-data on the server at Block 536. The server informs the client computer at Block 538, with an optional step of verifying the encrypted data at Block 537 by using the verification process shown in FIG. 5F.

FIG. 5E shows the steps for changing user data only. The user clicks a link or button for changing the data at Block 540, provides the key and new data or causes the client to read the new data and the key at Block 541. Both the new data and the key are uploaded to the server at Block 542. The server encrypts new data by using the key at Block 543, and saves the encrypted data as E-data on the server at Block 544 to replace the old encrypted data. The server informs the client computer at Block 546, or optionally verifies the encrypted data at Block 545 by using the verification process shown in FIG. 5F.

Figure 5F:
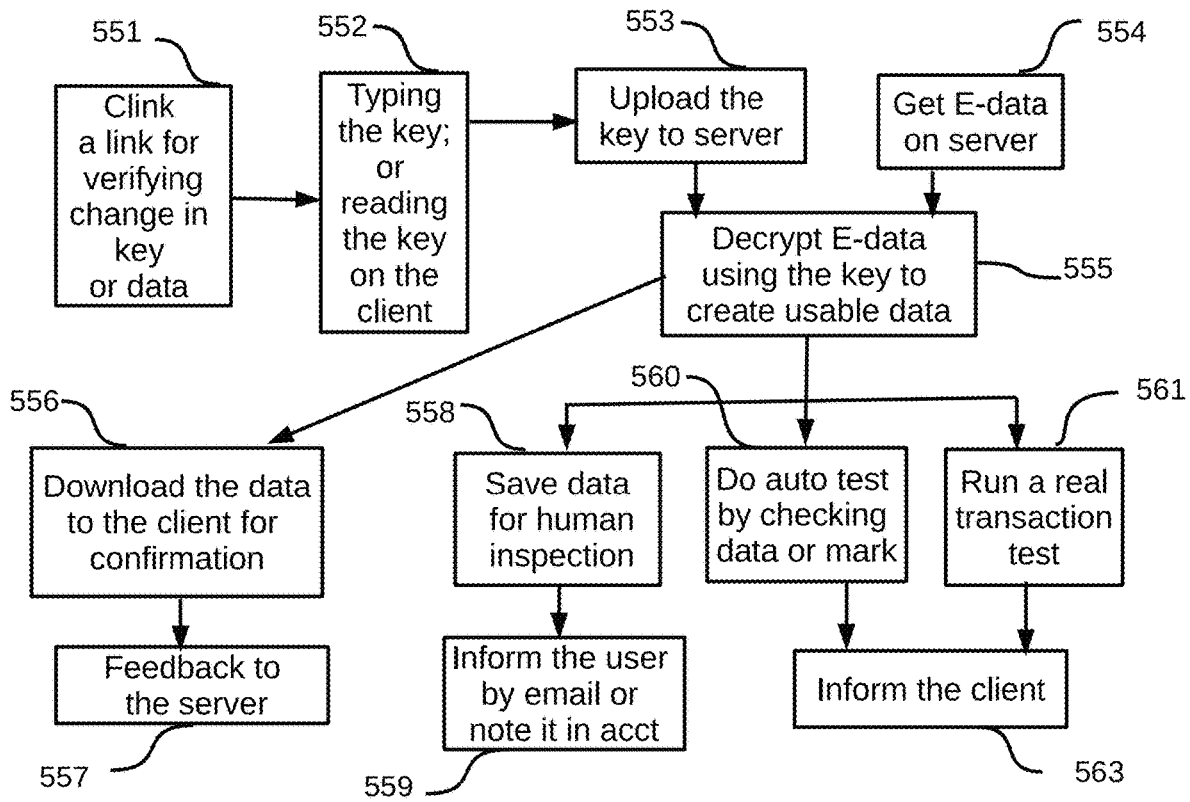
FIG. 5F shows the process for conducting a verification test to determine if the stored user data is good and/or if the key used is correct.

FIG. 5F shows optional steps for conducting a verification test. The user starts a verification test by sending a request or upon clicking a link or button calling a verification page at Block 551. The server asks the user to provide an encryption key or select an option for the client computer to find the encryption key at Block 552, sends the key in a proper form to the server at Block 553, and uses the key to decrypt stored encrypted data (E-data) and optional V-data at Block 555 (V-data is not shown in the figure). The usable data is downloaded to the client computer at Block 556 and sends feedback to the server at Block 557.

In the alternative, the test step may be performed as follows: the server may save the data for human inspection on the server at Block 558, conduct an automatic data validation by comparing the two resulted marks or by checking field data digital characteristics, word length, and appearance of words and phrases, etc. at Block 560, or run a real transaction test such as making a payment, doing a search, conducting a computation, processing data (e.g., sorting data, arranging digital characters, replacing characters, playing sound, rendering video picture, generating a web page, creating data table, etc.) at Block 561. The server informs the client whether the auto test or the transaction test is successful at Block 563. Upon finishing, the server may optionally send an email message to the user, confirming the change of encryption key.

The present invention is used to improve payment technologies by changing the internet ecosystem. One common payment method is recording payment credits for a series of transaction and then making a final payment. In this type of payment transactions, user data is used each time in processing a payment. In this case, a credit card number or bank account number are not required for recording each individual payment transaction but other information may be encrypted, and the payment amounts for all transactions may be added up for a final settlement. The buyer and the seller can settle their final balance at any proper time by using any conventional method.

Another type of common methods is widely used in the billing systems of utilities companies such as electrical companies, water companies, gas companies, government agencies, and organizations. In such a billing system, the customer data such as credit card numbers, banking account numbers, and other sensitive data are stored in the database of the billing system. The key modifications are: at least one credit card account number or other payment account number, together with other information, is saved on the server by using a setup page or by making a first payment. Thus, the account number and the designated sensitive information are encrypted on the client computer or the server, and are saved on the server. In making a payment, the utility company or the merchant gets the encrypted account number together with other data from the server, causes the encrypted account number and other encrypted data decrypted on the client computer or the server, and then sends a payment request including the account number to a payment gateway or central computer, which then causes the issuing back to transfer a required amount of fund to the deposit account of the acquiring bank of the utility company. Detailed arrangements are well known and are used in routine payment transactions.

In this payment transaction, a payment gateway, like a payment processor, transmits payments between the customer's (e.g., the user's) bank and merchant's bank. It is primarily used as a tool for e-commerce or card-not-present transactions. The gateway authenticate the user's credentials against the possibility of attempted bank card fraud. The payment arranged is bound to a specific transaction which cannot be used to benefit a thief. Moreover, the added storage encryption provides enhanced security. If a thief does not know the encryption/decryption key, he is unable to make authorization for the payment data. This layer of encryption used in data storage does not affect data encryption in transmission by using secure socket layer (SSL).

Another payment system is shopping carts, which are used by online merchants or business entities, where the customers may store credit card numbers and sensitive personal data. One version of shopping cart is disclosed in the U.S. Pat. No. 5,715,314A, all details of which are expressly incorporated by references as if they are fully disclosed. The shopping cart may be modified as follows: the user data (e.g., the customer's data) is entered by customers during the payment step or a setup step; payment information is stored on the merchant computer as alternative options even if such data is not saved but used only once in the prior art; when the customer checks out, the server includes a summary page showing description of items in the shopping cart together with one or more stored payment methods without showing details; when the user selects a payment method from the stored payments, the server updates the summary page by showing the selecting payment method with partial name of the card; this summary page includes at least one data entry field for accepting an encryption key prompts the user to fill in the data entry field an encryption key/decryption key and to make a final submission, the server uses the included key to decrypt the stored account information on the server, and finally upon validating the account information, the server uses the account information to complete the rest payment transaction.

All credit card information, access message authenticator, payment authorization, etc. used in the shopping cart may be further encrypted during transmission by using secure socket layer, etc.

The invention may be used to improve existing payment systems to achieve following three purposes. The payment system is used by plurality of customers or for making repetitive payments, at least some payments are made by using card-not-present methods, and the storage of card information OR sensitive personal information are desirable. Since the invention is made to alter the internet security ecosystem, it can be used in most current payment systems. For example, the invention can be used to improve or alter the utilities of the following exemplar systems: U.S. Pat. No. 10,346,843 (Systems and methods for cost altering payment services), U.S. Pat. No. 10,339,525 (Confirming local marketplace transaction consummation for online payment consummation), U.S. Pat. No. 10,318,944 (Near field communication terminal for performing secure payment and secure payment method using the same), U.S. Pat. No. 10,296,902 (Payment device with data entry keys); U.S. Pat. No. 10,275,756 (Method of making secure electronic payment using communications devices that make use of a phone number or other alias in lieu of a payment instrument identifier), U.S. Pat. No. 9,595,031 (Payment via a messaging application), U.S. Pat. No. 8,515,870 (Electronic payment systems and supporting methods and devices), U.S. Pat. No. 10,235,669 (Real-time mobile wallet server), U.S. Pat. No. 10,339,746 (Mobile device for making a mobile payment), U.S. Pat. No. 10,229,450 (Generating sale transactions from voice data input by a user), U.S. Pat. No. 10,229,450 (Generating sale transactions from voice data input by a user), U.S. Pat. No. 10,108,960 (Method of completing payment through clients, related devices and a payment system), U.S. Pat. No. 9,934,784 (Voice data processor for distinguishing multiple voice inputs), U.S. Pat. No. 9,864,958 (System, method, and computer program product for video based services and commerce), U.S. Pat. No. 9,734,491 (Voice call payment systems and methods), and U.S. Pat. No. 9,626,703 (Voice commerce).

The invention can be used to improve security measure for the invention disclosed in U.S. Pat. No. 10,269,010 by Tunnell et al. That invention is intended to mitigate risks that arise from the user sides (e.g., the long-in process), but could not prevent any problems from the insider's breach of stored sensitive database. The present invention is intended to address a completely different problem. The security feature of the present invention can be added on to that invention to make a much securer payment system.

One modification of existing business transaction methods is an additional authorization step for making each payment. The user must provide a right encryption key to decrypt previously encrypted user's data on the server, or download the encrypted data to decrypt on the client computer and send the usable data back to the server. In an alternative, the step of authorizing business transaction discussed in FIG. 3B may be done by email, telephone call, instant message, or micro message as fully discussed below. In each case, the user accesses the system, authenticates his identity by verifying his account password, email address, phone number, customer ID or customer PIN or any combination thereof, the person is prompted to provide the encryption key for decrypting the stored payment information with an optional payment amount. Upon getting the key, the system gets encrypted payment information and decrypts payment information using the key to generate usable payment information. The rest transaction will be done in the same way as the prior art method.

The current well known telephone payment system has essential all components: the user can assess the account and authorize merchant system to make a payment. The user needs to access his customer account. After the user has entered his customer account, the user selects a scheduled payment transaction. The only modification is adding a prompt that asks the user to provide an encryption key, using the key to decrypt the encrypted payment data. After the usable data for payment transaction is produced, the merchant system will complete the payment transaction.

The payment may be authorized by using an instant message from a distinctive cell phone. For example, certain time before an expected date of the scheduled payment, the server sends an instant message to the authorized cell phone of the user, together with a unique transaction code, a string or long URL, or mark as the identification of the concerned payment transaction. The message may limit time for making a payment transaction. To authorize a payment, the user returns the same message together with an encryption key or an encryption key together with a copy of the unique transaction code, string, URL or mark. Upon receiving the message, the server will use the encrypted key to decrypt the stored payment data and make the payment transaction. In alternative, upon user click of the URL, the smart phone opens an associated web page for the user to enter the encryption key to finish the payment transaction.

A method substantially similar to the method of using instant message may be used by micro message.

A preferred method for making a transaction may be realized by a special email method. Before scheduled time of making the transaction, the server sends an email message to the user. The email may contain a link which, upon clicking, will open the page for sending an encryption key. This link must contain sufficient information for identifying the user and the scheduled transaction, but do not contain other information that is understandable to ordinary persons.

The email may contain a text containing unique string or code together with an instruction for providing the encryption key in a specific location such as " . . . [key string] . . . " This email has a special returned email address of the business and instruct the user not to provide personal messages. The user then fills the encryption key in a specified location and sends the email. The email is received by a special email server which may be a payment-assisting system that does not allow any employees to read the email. Instead, the server processes each of such payment authorized email by capturing the unique string, the encryption key, or combination that allows the payment server to associate the authorization email with the user and a scheduled or expected transaction and complete the payment transaction.

One or more data fields in the email may contain business-provided data and optionally partial user data to modify saved user data. The server then uses the stored user data, newly arrived user data (such as amount and a new payment date) and the encryption key to process the payment. After the payment is successfully processed, the server deletes the email entirely or the encryption key from the email. Optionally, this server may be integrated with the payment system so that the user can open a page for making an authorization for making the payment transaction.

Authorization steps may be performed by using email clients such as Outlook, Thunderbird, Mailbird, Mail, Evolution, Poxbox, the Bat!, Eudora, Claws Mail, TouchMail, Becky!, EmailTray, Newton, Scribe Mail, Pocomali, Courier, Windows Messaging, Columba, etc.

If email is used to initiate a payment transaction, the merchant server sends email to the user, asking the user to click a link or button. The user clinks the link or button for accessing the web page for making a scheduled transaction. If the link contains sufficiently long and complex path name, a payment authorization may be made without requiring the user to login to the user account. Otherwise, the user is promoted to log in the account to make the authorization.

In another modified method, upon user's clicking the embedded link in the initiating email, the server will open a global transaction authorization form, with or without logging into the user account. The user then fills data in the form, and sends the filled form to the server. The server uses the unique string or identification code as part of URL to associate the form with the user and the scheduled transaction. The user makes authorization by submitting the form. If the user is unable to submit a filled form due to heavy traffic or network problem, the server non-responsiveness, etc., the user may email the filled form as a secure email to the special email address of the email server, the mail server will capture all required data to process the scheduled transaction, and delete the email or user data from the email. This email delivery option can help the user avoid the logging into the server.

At present, a fully functional web form cannot be embedded on most email clients. It is a matter of the standard-setting issue. There are already examples that it would be possible to make e-mail an extremely effective tool. If email clients implement web standards in a consolidated way, delivering web forms by email is one of the best methods. Gmail, Yahoo mail, and other online web email may work also. Before the form function is fully implemented in web email, a transitional option is to use distinctive marks and values pairs to carry user data so that the email server can capture user data for processing an authorization.

The general concept disclosed in the first embodiment is equally applicable to other business situations where user data are used by the server. In another embodiment, encrypted user data can be processed, edited, or used in Block 514, FIG. 5B. The types of activities that can be performed in Block 514 include, but not limited to the following:

(1) Creating a web page using at least part of encrypted user's data and optionally newly added user data.

(2) Conducting data transformation before the data is used. Data transformation may include sorting, replacement of words and digital bits, rearrangement of words, extracting of special words, separating or splitting words, breaking up data pieces, changing file formats from a useless form to a useful form, creating a new form of data, etc.

(3) Conducting a search using user-provided keywords, against decrypted user data, getting a search result, and presenting the result on the client computer or using words in the usable data as search keys to search other data.

The responsive page may contain user's original data, transformed data, processed data, derivative data, or any combination thereof. Optionally, the user may review, process, and evaluate presented data on the client computer, write a summary, comment, statement or text, and upload the written data on the server and save them in a file or database as new data. Optionally, the new data may be encrypted by using the same encryption key or a different key.

2. Protecting Medical Records by Patients

Medical records might be needed in emergence cases. Thus, encryption by using patient keys should not affect patient emergence treatments.

Any part of online medical records may be encrypted by using patient keys per the first embodiment.

One preferred method is separating medical data into personal identity data, payment data, and medical records. The medical records can be identified by using a full person name with a unique code or text string for identifying the person. Birth date, social security number, payment information, and other personal information should not be entered into the body of medical records.

Personal identity data and payment data may be shown in the user data Summary Table as in FIG. 4. They are encrypted by using the user's encryption key. When the user does not provide the encryption code, the server can generate a medical report with only person name and the unique number or string. The information should be generally enough for emergence use. Full personal identity, such as birth date, social security number, payment information, and optional personal health data will appear in a printed medical report only if the user has provided an encryption key to decrypt the user data. An initial setup may be made by an email link, a link by a health care, a phone call to urge the patient to log in to the user account, etc.

Similarly, the medical provider may use patient-provided credit card data for charging service fees, the health care provider should not save credit card data and necessary payment information in an online server that can be accessed by the public. For health care providers, there are several ways to deal with payment methods:

(1) Payment data is created and authorized by using the method disclosed in the first embodiment. The patient will control the transaction by using a user-provided encryption key. In addition, patient may designate other personal data as encrypted user data.

(2) Payment data is stored on a separate off-line computer which is not configured to have network access. Other sensitive data designated by the user may be encrypted and tracked as single or related entries. To avoid insider-assisted attack risk, such an off-line system should be configured to restrict accesses by using strict internal policies.

The purpose is reduce the inventive for hacking the whole database and alter the internet ecosystem. Weak security in some individual user accounts is not important.

3. Protecting Credit Report Data by Consumers

Credit agencies sell credit data mainly in two ways. They sell partial data to prospective merchants who need credit scores in selling their products. They also sell full credit reports to companies that need credit data in conducting business with consumers.

Any part of the credit report or the full report may be encrypted according to the first embodiment. Thus, such a credit report is not viewable without the authorization of the consumer.

A preferred method for safe protecting credit data is separating personal identity from the credit reporting data. Personal identity data are stored in one file or data tables while the full report is stored in another table. A report is associated with the right person by using a name plus a unique identification code, which might be a number, a string or a combination. Person's name and the identify code are stored as a usable form.

The consumer may choose to encrypt some or all personal identity data, the full report. The reporting agency keeps identity or identification data in the usable form on a computer system that is not directly accessible from the internet. The identity or identification data for use in production site is encrypted by using user-provided key. Credit report database contains redacted transaction entries, without personal identification data, credit card numbers, banking account numbers, and anything consumers might object. All personal information is redacted from the transaction histories.

Even if a consumer chooses to encrypt the identification data by using the functions shown in the User Data Summary Table, the agency can locate a related redacted credit data for the consumer.

If the consumer authorizes the agency to issue credit reports, the consumer enter this own key to decrypt protected user data. Personal identity data is processed and inserted into the full credit report.

4. Protecting Banking Data by Users

Bank data breaches are very harmful to consumers because account information can be used to steel money. Personal identity data can be used to harm the consumers in many ways.

The bank can improve its financial transaction data by using the same principle stated in the invention. Since this class of data must be controlled by bank, the bank may need to use its own encryption key that is not stored on the system.

The consumer's user data can be protected in the same way. Banking data include (1) consumer's identity data such as social security number, birth day, email address, phone number, and addresses; (2) credit-related data including credit transactions, past dealings, past earning, etc.; (3) money receiving data that reflects money transfers from outsider sources; and (4) payment data that a consumer might have arranged to make payment by using credit card accounts, store accounts, patient accounts, etc. Most of the data can be encrypted by using a user-provided key shown in the User Data Summary Table.

Different types of data may be encrypted using different keys if they are used in different frequencies. The personal identity data may be used in connection with annual account review. The payment information may be used at daily, monthly, quarterly or yearly frequencies.

The bank may keep personal data in a system that is not connected to the Internet. To provide a method for solving identity disputes, the bank may need to maintain a central system that is off-line or contains encrypted identity data. In addressing a dispute, an employee can retrieve data from the system, and distribute found data to an investigative employee by secured email or messaging. The resolution system will not defeat the purpose of changing the internet ecosystem.

5. Protecting Data which is Used in Automatic Transactions Between Two Persons

In this embodiment, user data is created and used for the benefit of anther person. For example, user A and user B may transact a business on a system controlled by a thirty party. The user A provides user data stored on the system for the user B's benefit; and optionally, the user B may provide user data for the user A's benefits. All data must be used in a usable form by the server in conducting business transaction. If transaction can be done in small time windows, encryption of all user data will reduce the incentive to hank the whole database controlled by a thirty party.

The system has two hybrid systems, each of which is similar to that discussed for the first embodiment. Each of the users may upload user data to the server, encrypt the data, and store the encrypted data on the server. Each of the users may authorize transactions by decrypting data. At least a piece of usable data from the encrypted data is used in conducting automatic transactions such as making a payment, charging fees, distributing funds, collecting interest, collecting service charges, generate web pages, delivering services, etc. The third party running the server may get direct or indirect benefits from supporting the transactions.

6. Protecting User Data in Manual Business Transactions

The method disclosed in the first embodiment may be used in conducting manual business transactions. User data is encrypted and stored in an unable form. When there is a need, the user provides an encryption key to the server, and the server decrypts the data to generate a usable data, saves the usable data on the server. The staff of the server will access the usable data, review the data, or process the data by using non-automatic method.

The user may designate a special time as the use period. After the business transaction is completed, the server will delete the usable data automatically, or after the transaction period is over, the user may choose to delete the usable data.

In one version of the embodiment, two persons share user data by saving them in encrypted forms. Each of persons may decrypt data to generate usable data, save the usable data on the server, designate time window for deletion. After the transaction is closed, the server will automatically delete the data or any of the users may use online tool to cause the server to delete the usable data.

The method disclosed in first embodiment may be useful in protecting user data in dating website. The data may be classified as public data and private user data. Personal data is normally stored in an encrypted form.

7. Protecting User Data that are Hosted on a Server

One embodiment is a general model for protecting user data belongs to other persons. This model is shown by using an example for the Online Computing System.

The original data input may be done by manually inputting and uploading files, database tables, field data, etc. This model shows how the users edit, change, and use data between the encryption-and-decryption cycles. This is based on a sophisticated balance between trust-and-distrust in the server.

First, all user data, general data, etc. may be uploaded per the method described in FIG. 5A. Moreover, data may be transformed per Block 603 (See FIG. 6A). In this transformation step, the server can create template files, creating a model web page or forms, extracting data set, processing documents, converting file formats, rearranging data elements, adding an index to data elements or a database table in a large file, etc. for later use.

Figure 6A:
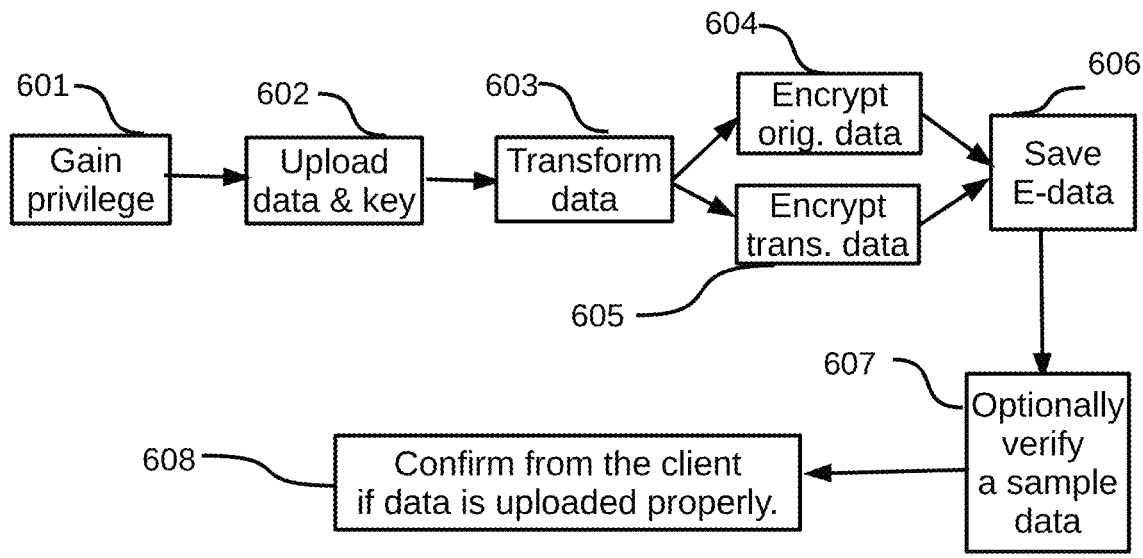
FIG. 6A shows the process for encrypting user's original data and transformed data and saving the encrypted data for later use.

FIG. 6A shows how the user data may be transformed to one different form of data in Block 603, and the transformed data is optionally encrypted in Block 605, and original data is encrypted in Block 604. In the use stage (shown in FIG. 6B), both encrypted original data and encrypted transformed data are decrypted by using the encryption key at Block 624 and 625. The resulted usable data is used in conducting computation to get a result in Block 627, the result may be optionally saved in Block 627, and downloaded to the client computer for the user in Block 628.

Second, both original and transformed data can be further processed after the data is encrypted in the transaction cycle. All possible operations discussed for Block 514 in FIG. 5B can be used in this embodiment.

The first embodiment can be used to increase computation data security. FIG. 5B can be modified as follows: the user submits encryption key with additional user data (containing variable values) to the server in Block 511, gets stored encrypted user data from Block 503, decrypts the encrypted data at Block 513, conducts a computation at Block 514, gets a computed result and adds user data to create a result page, deletes usable data in Block 515, and sends the result page to the user in Block 516.

Figure 6B:
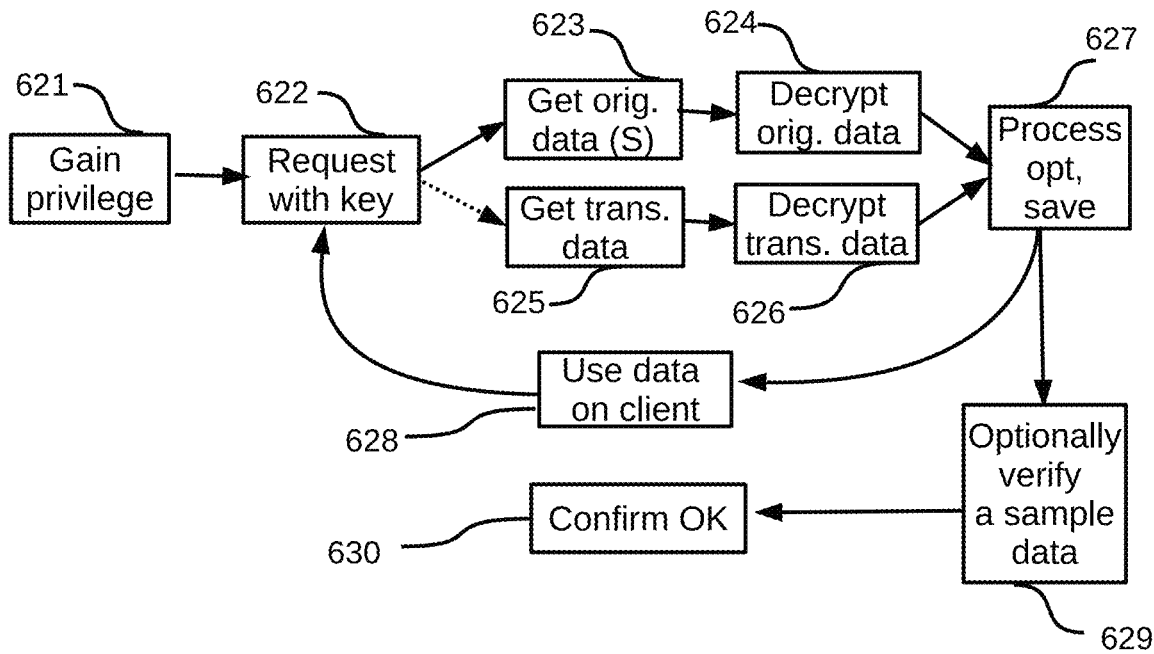
FIG. 6B shows the process for decrypting encrypted user data and decrypting encrypted transformed data, and rendering resulted usable original data and usable transformed data on a client computer.

Third, both original and transformed data can be saved as temporary data after they are decrypted per Block 627, FIG. 6B. Potential actions at this point include conducting searches, doing a computation, generating presentable web page, creating a table, doing any digital processing, etc. Optionally, processed results such as computational result may be saved here temporarily. The data may be saved as name-value pairs in a delimited string, text file, or other suitable formats. Original, transformed, or processed user data may be used to generate web pages (in a way similar to the way for creating the payment form). Digital data may be processed by a computer algorithm to remove noise, change sound characteristics, delete certain words or bits or change bits or characters).

Figure 6C:
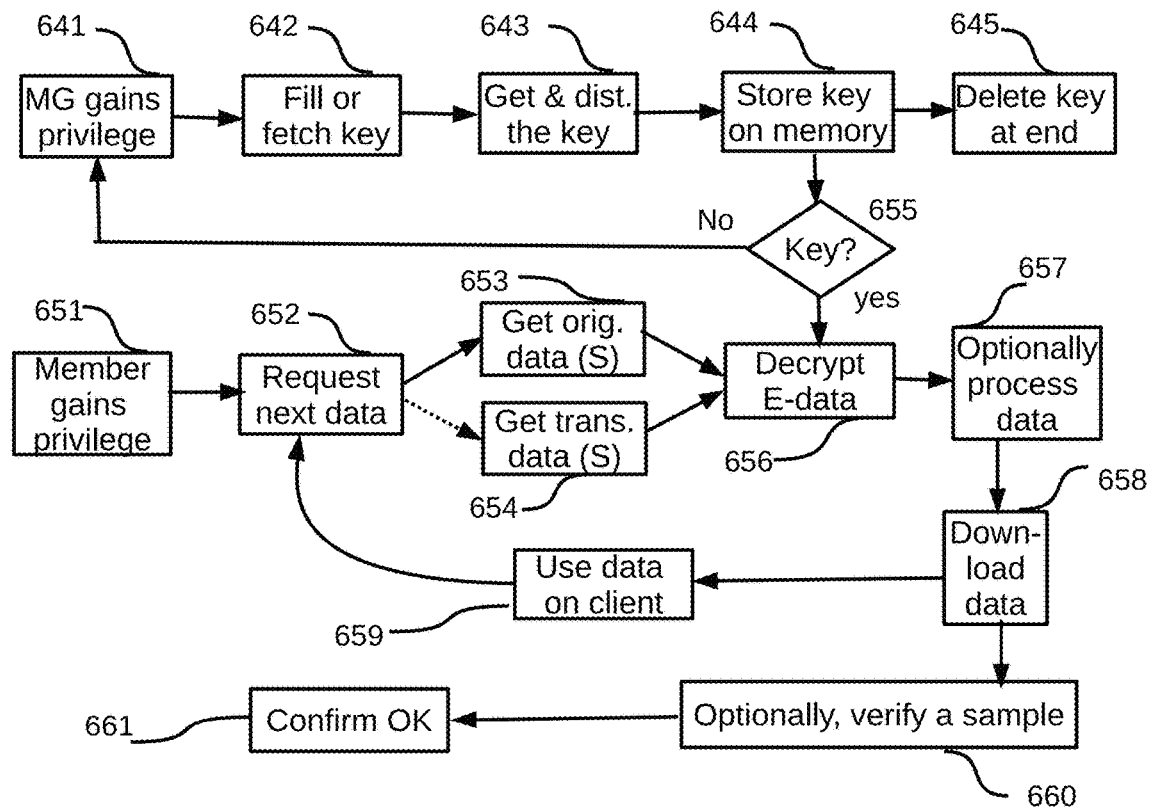
FIG. 6C shows the process for decrypting encrypted original data and encrypted transformed data by using an encryption key in volatile memory, and rendering the resulted usable original data and usable transformed data on a client computer.

Fourth, the user may create new data, edit existing data, or compile data that has been generated by the server (See Block 659, FIG. 6C; Block 712, FIGS. 7A-7B). Saving the data will allow a plurality of users to edit the user data so that each of the users can create summary data, and upload new data, and a managing user can combine all changes. The submitted data may be kept as unprotected data. It may be treated as new user data to change, supplement, or overwrite decrypted user data. The modified user data is then encrypted.

An alternative method is that edited data may bypass encryption-and-decryption cycles for specified times, and is then encrypted for safe-protection at the end of a work day or the end of a project.

Five, the request for sending an encryption key can carry additional data which can be saved as encrypted user data. The carried new data can be used in conducting business transaction in the Blocks 511-512, FIG. 5B (See the amount in Block 306, FIG. 3B).

The security benefits would depend upon two conditions: the temporary data should be deleted when work has been completed, and the encryption key is deleted within a reasonable time after all connections are lost or project becomes inactive. The encryption-decryption cycles make hacking rest data more difficult and remove the incentive to hack the whole database.

One unique component of this embodiment is that the stored encrypted data is used by the server or by another party when the data is in a decrypted state.

Other potential operations include the following:

(1) Transformation of data. For example, after the a text file is decrypted, the server is able to find certain keys, find and replace, or count the frequency of certain keys directly from the decrypted data. This operation is done when the user data is in a usable state.

(2) post-decryption processing. After the data is decrypted, the data is processed by the server by using the digital values or ASCI values. The most common processing methods include combining data pieces from different locations in a single file, from different fields of a table, or from different tables, breaking down data into multiple pieces, changing data formality or file types, extracting numeric values or certain keys, or any combination thereof.

(3) human edit, writing, and combining results per the process shown in Block 628 of FIG. 6B as long as those operations are done in reasonable time windows; and (5) carrying new data in a request. New data carried in the request may be merged into the existing data by going through a decryption-and-encryption cycle.

Following example shows how this data protection model can be applied to Online Computing System.

The Online Computing System comprises the following steps. The user selects a project by conducting a search, provides data or a file containing data, and uploads an encryption key to decrypt the stored data to generate usable data. The usable data is then used by the computing program and the result is presented to the user on a client computer.

In the original computation system, there is no need to use encryption. Inputted data may contain all data which is required for conducting a computation. The computation program or algorithm can take constant values and variable values from the usable data in conducting computation. Inputted data contains only variable values, optionally data on the computing project, but no constant values. The user data is used to generate a full result report with user data. Upon completing the computation, the server gets a result. Nothing is saved on the server.

The system is modified to save input files and results files. Those files can be encrypted and saved on the system. An input file can be created by dumping project data right before doing a computation step in the Online Computing System. At this point, the system gets all constant values, user-provided variable values, and units. It has all required data including a project ID.

The inputted data contains constants, optionally data on the computing project, but no variable values. In conducting the computation, the user uploads an encryption key to the server, and decrypts the encrypted stored input data to invoke computation. The system then generates a computing data input form, prompting the user to enter variable values. Upon completing the computation, the server does a computation to get a result and writes the result in a file for rendering on the client computer. The server may also encrypt the result file and saves it for later use. All usable data is then deleted. The variable values are not saved.

In the alternative, a custom input file may be used as means for inputting data that the computing program needs. The file is saved on the server in an encrypted form. When running a computation using the input file, the user selects the input file on a request with an encryption key to the server, and the server decrypts the saved input file to convert it into usable data, loads the usable data in creating a computing data input form, and rendering the form on the client computer. The user optionally modifies or changes any data on the computing data input form, and submits the form to conduct a computation to get a new result. The server writes the new result as an appended text to the input file or a separate result file, and encrypts the input file or the result file. The server renders the result on the client computer. All input files and result files are stored in the encrypted form which cannot be hanked.

8. Protection of Database Field Data Using the User's Encryption Key

The embodiment of the present invention can be used to protect any of database fields. One issue is improving search efficiency. In prior art, typical method is to store both the encrypted value and a one-way hash of the value. When the system seeks a specific value, it would seek the hash. The system can query efficiently, without having to decrypt every row to find the value sought. Another method is to just extract keywords to be stored for search purpose while no search will be performed actually on the encrypted data.

The method disclosed in the first embodiment can be used to manage database. The user may designate one or more fields as encrypted fields. If asymmetrical keys are used, both keys must be sent to the server for use. Both the keys are used by the server, but not saved on the server permanently.

In any operation on encrypted data fields, an appropriate key is used to encrypt and decrypt data. The user interface for accessing, adding or modifying encrypted data must contain the key, with optional new usable data. The method can be used in all known commercial database applications. The encryption/decryption key may be stored in volatile memory according to the method discussed in FIG. 6C (see Blocks 641-645).

9. Protection of Group Data by User's Encryption Key

In this embodiment, all data is owned by one person or an entity, but is shared or used by a group of users working for the user or the entity.

Figure 7A:
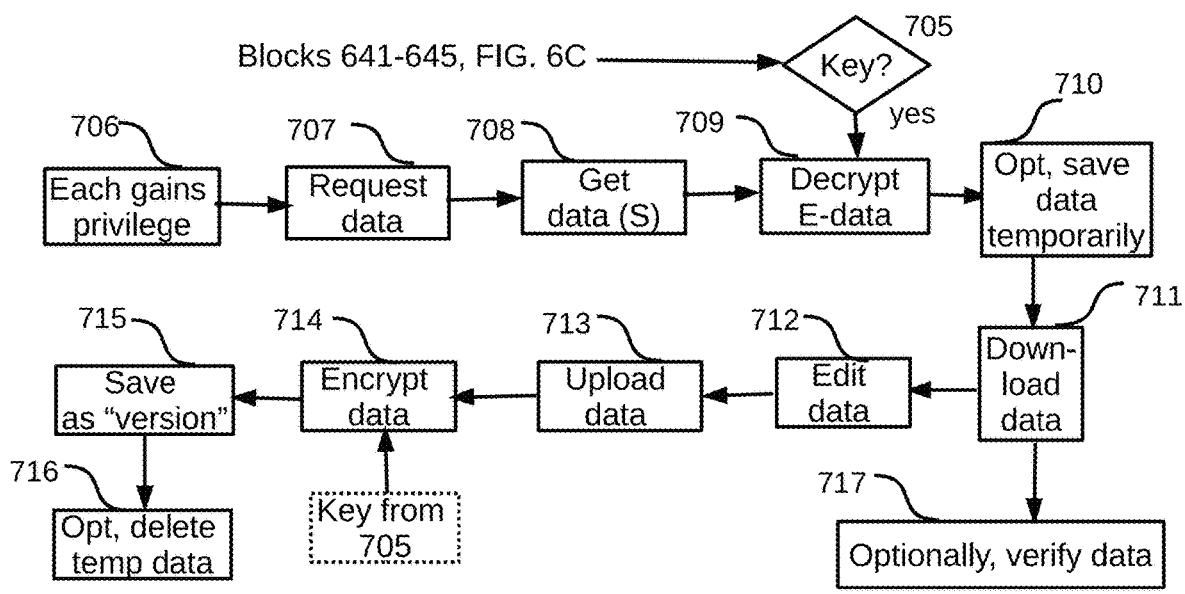
FIG. 7A shows the process for editing user data on a client computer after the encrypted user data has been decrypted using a user-provided encryption key.

As shown in FIG. 7A, the user gains privilege in Block 706, makes a request in Block 707. The server gets data in Block 708, decrypts data to generate usable data in Block 709, and saves the usable data as temporary data in Block 710. The usable data is then downloaded in Block 711, viewed and edited in Block 712, uploaded in Block 713, encrypted in Block 714, and saved as a new version or as replacement of user data on the server in Block 715. All data in the temporary data is automatically deleted upon expiration of time, or upon the user's action on a user interface in Block 716. Since the key is maintained in Black 705 for the user data, a plurality of users can edit a document and save many document copies. The managing user can merge all changes into one final document, and then delete working copies of the document.

In one application situation, project data is used only in a usable form but is not changed. All data are uploaded and encrypted by using the same encryption key. In another situation, project data is transformed into other forms such as text files, HTML files, excel forms, database table, other file formats for applications like Word, Excel, and Office-Write and any suitable file formats as in Block 605 in FIG. 6A. Data transformation takes place before the user data is encrypted or after the data is decrypted.

Since the data is viewed, reviewed, processed, or read by a group of users, carrying key is inconvenient. There are three major methods for managing encryption keys.

(1) Managing Encryption Key

1. Encryption key carried in each request. If project activities are sporadic or project members work at different times and different locations, the encryption key may be entered in each request. To avoid finding key each time, the system may be configured with a function to get the key from the client computer. An alternative method is to read an encryption key stored in a designated key store, a folder, cookies, or a USB device. Designated folder may be a folder on the client computer or a folder in a USB drive. The device may include a card reader, USB fab, smart card scanner, future driver's license scanner, computer accessible security token, or other input devices. This user interface may provide an option to promote the user to select a folder or device so that a script program can access and get the encryption key.

2. Store encryption key in volatile memory. If data is used by one person or a group of persons in multiple transactions, the encryption key may be stored on volatile memory or global variable which is designated for a user account, a group's project, a server, intended project data in a data center, or a whole system.

The encryption key is first submitted to the server or fetched from a designated location on the client computer. If multiple servers running to process data for the project, the same key is copied to the volatile memory of each server or make the key available to all servers.

If the server is running on the internet in a perpetual non-stop time, what is critically important is reducing the key availability on the system. The key is made available only when there is a need. If the key is not used for a reasonable time, it disappears or deleted. When a hacker attempts to capture the key in transmission, the hacker will most probably miss it.

The encryption key may be stored in a session object declared for a user or the group or the project. As long as a member is connected to the server or any member is active, the key will be there for use. The key may be acquired from a received request from a first connection in which the server promotes the member to provide an encryption key. After the key is optionally verified to be good, the server will store the encryption key in a session object for the connection or a session object for the group or project. The session object is kept alive as long as a connection is alive or any member's connection is alive. The session object is killed when all connections are lost or after the last member of the group logs out. The key may be saved on a session object of a designated member as an alternative.

The server may provide a tool to allow a server's employee to see its existence, partial digital characters, or partial information without disclosing the full digital content. The whole key is not be visible to the server staff and not permanently saved on the server. If the key is corrupted or damaged, a best way to recover the key is for a user to submit a new encryption key, and the server will redistribute the key, if necessary. If the server is rebooted or stopped, the key on the server will disappear. The key cannot be recovered from any disk, saved application data, application logs, temporary data, etc.

3. Encryption key management tool. The tool may be used to manage the encryption key for a complex project. User data is stored in a remote server, and a plurality of users worked on client computers at the project site, and a large number of data items such as files are to be processed, it is preferable to use this method to manage the key on the server. The key is assigned, maintained and controlled by one of the users at the client site. The server may keep an acquired encryption key in volatile memory: an application global variable (e.g., in Java, it would be the public field in a global class in an application package), a variable for a group or project and a variable for a specific connection.

For example, public class Topkey {public static String key1; public static String key2; . . . }. Now, Topkey.key1 can be used to assign value and access stored value. Different programming languages used in developing the system requires adherence to different conventions. What is important is that variables declared and used must be consistent with the intended application scope, and the encryption key cannot be used or accessed by unintended users, unintended applications and unauthorized users. The key management too may support various schemes such as one key for a project and one key for several projects. Multiple keys may be used to protect different folders, different sources of data, and even different projects owned by the same user.

In a fallback option, the encryption key may be temporarily stored in primary storage media on a server on the following conditions: (1) there is no tool for retrieving, viewing and storing it; (2) server employees cannot view the full digital value of the key but see only partial information on its existence and condition; and (3) it is deleted whenever the project is inactive or all connections for the group or project are lost. It is important that the key cannot be recovered from a stopped server, hard disks, other storage media when the server is stopped. However, a risk is that when the server abruptly malfunctions, the server may fail to delete the key, thus the key may be recoverable by server employees by a small chance.

For a system with perpetual connection to the internet, the first key-management method is the most secure.

(2) Using Temporary Data

Figures 7B, 8A:
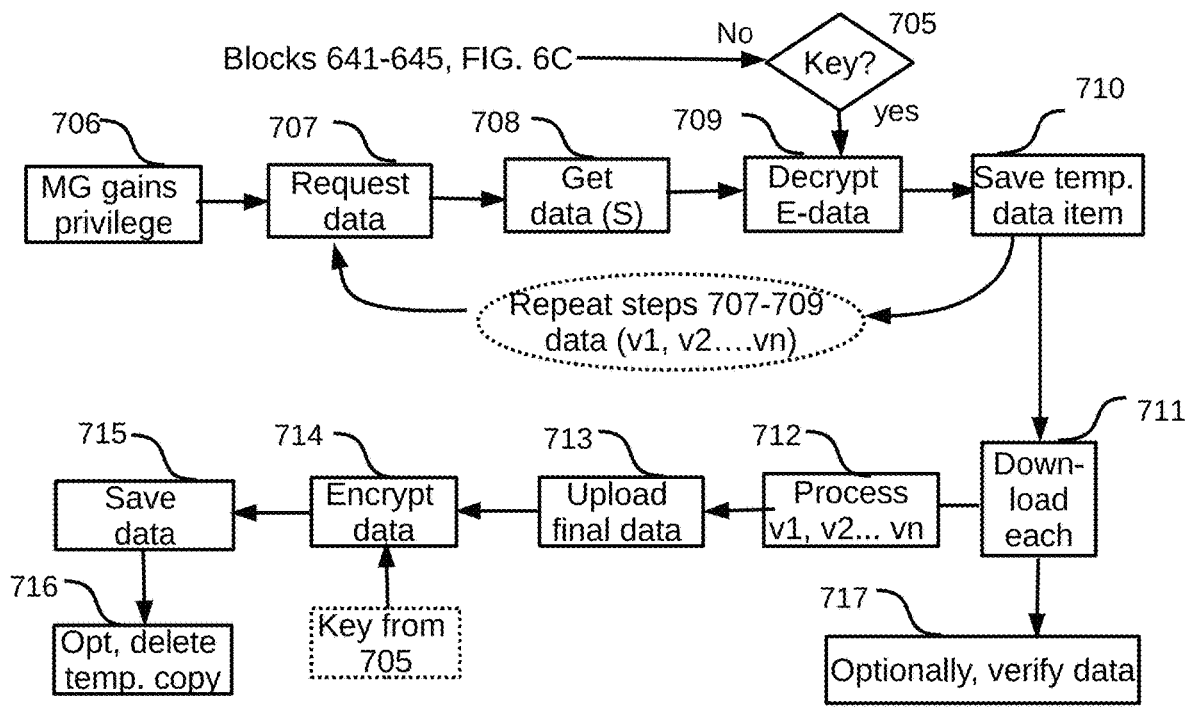
FIG. 7B shows the process for editing a series of encrypted data items on a client computer after the encrypted data items have been decrypted using an encryption key stored in a temporary location.
FIG. 8A shows a user interface for designating project members to provide personal keys, which will be used to generate an encryption key for encrypting data for a group or project.

Saving usable data as temporary data is an option discussed in FIGS. 7A, 7B. This option is necessary for editing user data. Editing user data is possible only after the server has decrypted the data. Optionally, any of the members may download the user data as backups on the client media. Upon specified times, the user may encrypt edited data and delete the temporary usable data. This scheme can be used to edit documents by a plurality of users.

One example is shown in FIG. 7B. Each user logs in Block 706, sends a request for accessing user data in Block 707, gets encrypted data in Block 708, saves the first editable copy in a temporary storage space in Block 710, downloads a copy in Block 711, edits the downloaded data in Block 712, uploads edited data in Block 713, encrypts the edited data as a distinctive version in Block 714, and saves the distinctive version in Block 715. By using the same method to download all versions, a managing user can finally merge all changes (See "v1, v2 . . . vn" in 713 in FIG. 7B) into one file, encrypt the final file, with an option to encrypt all edited intermediate files or delete them.

The true security benefit of this method is not obvious. This method can reduce the population ratio to usable data to total stored data. The on-and-off-action has an effect of shortening data vulnerable residency times.

(3) Protecting Large Project Data Among Account Users

All project members have similar user accounts on the server, the group data is stored on the server, and users can access and view the group data from their accounts. In this environment, some of the group data is encrypted, and can be used only in the time window when the data is in a decrypted state.

All five types of actions for editing and processing data: transformation of original data, post-decryption processing, post-decryption storage, human edit and writing, and adding new data in an uploading request can be used in each decryption-and-encryption cycle.

The work product may be encrypted by using the same or different encryption key. Since the work product is only copy, the user is prompted to make periodic backups. After the project is finished, the work product is decrypted by using the right key and resulted usable data is removed from the online system to an off-line system.

The thrust of the invention is avoiding saving the encryption key on a database and avoiding using the exactly same security method for all user accounts, resulting in a different internet ecosystem.

10. Protection of Group Data by Multiple Personal Keys

Another embodiment is that a group's data is controlled by at least two encryption keys that are controlled by different members. The data can be used only when all designated encryption keys are available to decrypt the data. The method is used in two situations: multiple users share user data in a shared account or a single system, and a project data is used by multiple account users.

(1) Method for Generating an Encryption Key

In this version of embodiment, the server supports a method for selecting a list of users who provides personal keys, as shown in FIG. 8A. This figure shows that the user may select any four members as key contributors. This embodiment supports a key-management method, as shown in FIG. 8B.

Personal keys are used to generate an encryption key which is used to encrypt and decrypt user or group data. The personal keys containing suitable characters or strings are properly combined by appending, logically XORing, or digitally mixing to form the encryption key. Digital mixing might include unique character combination, mixing digits of characters from different personal keys according to a predetermined pattern or scheme (e.g., all sequential odd digits is taken from one personal key, and all sequential event digits are taken from a second personal key), any reasonable scheme of mixing. The only requirement is that the method can generate only one unique encryption key. Suitable derivation functions may optionally be used to stretch the encryption key to increase the strength of the encryption key.

In the alternative, multiple encryptions may be used in lieu of using different keys. Data is encrypted by a first user's key, and resulted data is then encrypted again by using a second user's key. Decryption will be done in a reverse order.

(2) Method for Generating an Encryption Key

In an environment involving multiple user accounts, an encryption key can be generated according to the following methods.

1. Upon a request, the server generates a user interface with web page and sends it to a managing user showing all user names as potential persons for providing personal encryption keys.

2. The new user designates the user accounts that will provide encryption keys.

3. Based upon the selection of the user, the server sends a user interface to each of designated users.

4. Each of the selected users responds by including a personal key to the server.

5. The server gets each personal key and saves it in a temporary file or data table. In each operation, it checks if all individual keys have been submitted.

6. The server will generate an encryption key by using all personal keys stored it in a temporary file or a database table according to a predetermined scheme.

7. The server deletes all personal keys from the temporary storage locations.

8. The resulted encryption key may be stored in a volatile memory, project session object, or global variable for the project or group. Key stretching is an option as long as it is used consistently.

Preferably, the server may conduct a verification test. The server prompts each of designated key providing users to provide his or her personal key. Each user may be presented with a hint as a reminder. The users will submit their keys in their own times. After all personal keys are submitted, an encryption key is constructed per the predetermined method. The server uses the encryption key to decrypt a saved user data piece or the verification data (which may using V-mart and a project password). After the verification is successful, the system is ready.

Upon finishing conducting business transactions, the server deletes all temporary user data, all personal keys (if any), and the encryption key on the server. Deletion may be done by system actions such as destruction of object, destroying of servlet, deallocation of memory, overwriting of digital values, or reusing the memory space for others purposes.

(3) Running the Project by Using a One-Time Key

When the project is run, the server needs to encrypt data and decrypt data periodically. When the project starts, the server may construct the key in the following way:

1. The server sends email link asking each of the key-providing users to send his personal key within a specified time window;

2. Each of the users sends his or her key on a user interface with an optional key hint;

3. The server saves each submitted key on a temporary storage location such as a file or database table, and keeps determining if all required personal keys have been submitted;

4. After the server has received all personal keys, the server combines all personal keys per the predetermined method for creating the encryption key. Key stretching is optional;

5. The server saves the encryption key in a temporary location, and, as a best practice, deletes all personal keys.

6. The server performs all project functions by using the encryption key.

The project data can be used, processed, and/or edited only after the data has been decrypted when the original user data or transformed data are shown on a client computer. In addition, the work product of a user may be optionally encrypted by using the same encryption key or a different key (which can be generated by using the same method).

Whenever the project is inactive or the server is down, the encryption key will be gone, leaving the encrypted data in an unusable state. The method can reduce the risk of hacking. If the data is stored on the server for a very long time, all key providers are reminded that they must remember their personal keys. Project data should be backed up per preset reasonable schedules.

(4) Modifications for a Group of Users Under a Single User Account

A group of users may share a user account so that all of the users can login to the account to access the user data or group data. The users are listed as group members preferably by using email address.

In creating the encryption key, the server first prompts a managing user to designate at least one to several users as key-providing users. The server then sends email to each of the designated users a message containing a link providing a key. Upon clicking the link, the server opens a page, prompting the user to provide a personal key according to predetermined specifications. The user provides a personal key on the page, and submits the page to the server. The server gets and saves the personal key on the server. Upon receiving each personal key, the server determines if all required personal keys have been submitted. Upon a finding that all personal keys have been received, the server generates an encryption key and uses the key to encrypt and decrypt user data. The server deletes all personal keys, and optionally save a hint for each personal key and essential information on how to regenerate the encryption key.

When there is a need to use encrypted group data, the initial request may be made by a user, a server scheduled action, or a server action triggered by a server or an employee action. The server uses the method to get personal keys from which it can regenerate the encryption key. It then uses the generated encryption key to encrypt and decrypt the group data.

The encryption key may be optionally saved in volatile memory for the group, a session object, or a global variable accessible to the group only. If the encryption key is saved in a database or file, it should be invisible to any users, and is deleted when the project is inactive, last user connection is lost, or the server is down.

(5) Using a Single User Interface to Get Personal Keys

In one version of the embodiment, a single user interface is used to accept all encryption keys, as shown in FIG. 8C. The security benefits cannot be seen without understanding time effects of secrets, circumstantial changes, hacking incentives, and the whole system. This method is the most useful in dealing with wills and trusts. For example, one person, a settler, will create and store a file which is encrypted by using multiple personal keys. Those personal keys are then distributed to several persons. The data may be used to prevent disputes among those key holders in a future time. By the time when there is a need to decrypt the data, there is no need to keep secrets for the file. Using a single form for entering multiple personal keys is the most convenient. The encryption key is generated in the same way discussed above.

11. Protection of System Functions by a User Key

Server systems including a Versatile Information Management System disclosed in U.S. Pat. No. 10,069,892 B2 by Jianqing Wu implement functions for configuring a working environment for a user, a group, an account, or a system. Such a function allows a user on the client computer to change server configuration such as changing database table structures, setting up data sources for searching and data feeding functions, and changing account members, user information, and rights and obligations of the users. While those functions are highly desirable, they unfortunately create a risk that hackers may use the configurable tool to destroy the working environment, the accounts or the system.

A configuration function requires a configuration file, a program for executing the file and a command for call the program to run using the file. Thus, any of the configuration file, the program, or the invoking command can be encrypted by using a user encryption key that is not stored on the server. Without decrypting the file, it is impossible to run a configuration function. This method creates an ecosystem with a reduced hacking incentive.

This protective feature is realized in two steps. An encryption is performed on a configuration file, an executing program such as script, interpretative program or a compiled program, or an invoking command using the user encryption key to disable to the feature. One must make sure that the configuring feature will be disabled without causing an erratic default action. To run the configuring function, the user provides the encryption key to decrypt the file, the program or the command so that the server can run the configuring function.

12. Method for Changing the Encryption Key

The user may change the encryption key or keys to be used for a user, a project or group, a server, or a specified data store. The initial request may be made by a person on a client computer, or initiated by the server' action of sending an email message containing a link for opening a user interface.

(1) The server generates a page embedded with the user identity, a program name to be called, and other necessary instructions for changing the encryption key. The page may contain a hint for the old encryption key;

(2) The user provides the old encryption key, and a new encryption key together with optionally a new hint for the new encryption key;

(3) Upon submission, the client computer submits the page to the server;

(4) The server retrieves the old encryption key, converts the old key into the usable key if the key has been used in a stretched form;

(5) The server retrieves encrypted data from the server; and (6) The server decrypts the data using the old key, and encrypts the same data using the new key. The server calls steps 4 to 6 repeatedly, to change the encryption key for all data items.

The server may ask the user to verify if encryption has been done properly by conducting a verification test according to steps shown in FIG. 5F.

The key-changing form may optionally contain additional setup options for selecting the key location, search path for finding the key, and device that holds the key, and other options for the convenience of the users.

If the key is created by using multiple personal keys, the same method is used to create the old key and the new key. Both keys are saved in temporary locations for use.

F. Various Modifications in Implementations

This section shows how various version of disclosed embodiment can be modified and changed.

1. Developing Environment

All embodiments may be developed by using any one or combination of suitable languages. The front end languages include HTML, CSS, JavaScript (Angular, React, Ember, Vue, jQuery, Backbone), XML, etc. The server side languages include Java, Python, Ruby, C, C#, C++, CGI C, Objective C, PHP, Go, Swift, Rust, Perl, Shell, Viml, R, Fotran, etc. Web application development platforms or frameworks include WordPress, Java (Tom cat Java EE, etc.), PHP, Joomla, Magento, ASP.NET, JSP, Open Chat, Angularjs, Larvavel, React, Symfony, Yii, Meteor, Cake PHP, Drupal, Ruby on Rails, Prestashop, etc.

The system of the present invention may be implemented on a Windows, Mac, Linux, and Unix Platforms.

While the invention can be developed by using various platforms, containers and programs, the concepts can be realized by using custom designed user interfaces. One can avoid using an existing browser by creating a custom user interface.

The HTTP protocol is preferred because sessions in HTTP are stateless. When HTTP protocol is used, the client actually maintains state by using cookies, URL rewriting, writing to database, query string, SOAP Headers, etc. Stateful application servers can be built on top of HTTP. Since Web protocols like HTTP are installed and running on all operating systems, messaging protocol like SOAP allows clients to invoke web services and receive responses independent of language and platforms. SOAP allows processes running on disparate operating systems (such as Windows and Linux) to communicate using Extensible Markup Language (XML).

When the system is implemented by using an HTTP protocol using existing web server and browse, it is essential to maintain state by using various known methods. Cookies are messages that web servers pass to the web browser when the client computer visits Internet sites. The browser stores each message in the cookie file. When the client requests a page from the server, the browser sends the cookie file back to the server so the server know about the client.

Embedding path and program name on web pages is another method. Each time when the server sends a web page, it normally contains path name together with the name of the program, which will process the form that has been returned to the server. The called program will process a distinctive transaction. In addition, the form or web page may be embedded with one or more variable names and values as hidden variables. The variable values may come from prior transactions or be set by the user in a user action. The server can be designed to get values for many variables by many rounds of trips although a plurality of data fields may be filled with values on one single page. Finally, limited variable names and values may be written in URL path for calling a next program or page.

The illustrated user interface is based on web applications. This is the fastest way to implement the concept. However, an alternative custom client can be used according to the concept of the present invention. It is natural that any one can use appropriate user interface to implement the concept.

The user interface can follow the common layout that is often seen in a FTP client. A large number of FTP clients exist. They often use the client page and server page side-by-side. Many FTP clients that have been published have the common features of browsing server file directories, showing file tree structures, uploading files to the server, downloading files from a server, and changing files statuses such as the security setting. Some FTP clients may be downloaded with source codes. Therefore, those components can be used or modified by skillful programmers in combination with the encryption method to arrive at the claimed invention. Also, the algorithms and source codes for browsing directories, viewing files, changing file names are also available in open source Linux systems. The source codes can readily be modified to implement claimed features. A custom user interface can be developed for Windows, Mac, Linux, and Unix operating systems.

2. Controlling Encryption Keys

Encryption keys should not be saved on the server. It is preferable to delete encryption keys after user data is not used in a reasonable time. If the method is implemented by using servlet, the destroy( ) method is called only once at the end of the life cycle of a servlet. This method gives the servlet a chance to close database connections, halt background threads, write cookie lists or hit counts to the disk, and perform other functions such as cleanup activities. After the destroy( ) method is called, the servlet object is marked for garbage collection and all instance variables are trashed. The HttpServletRequest and HttpServletResponse live from the time the servlet receives an HTTP request from the client, until it completes a response (the web page) has arrived. One should not assign any request or session-scoped data as an instance variable of a servlet or filter. It will be shared among all other requests in other sessions. The data that is not shared among threads should be declared as protected data.

If the program is created in C, memory freeing would serve the same purpose. As a general rule, it is preferable to delete the encryption key in an affirmative action to avoid the possibility that it is captured by someone.

3. Protection of the Encryption Key and User Data in Transmission

Data transport security is important for two reasons: First, the original user data must be uploaded to the server. Even though the vulnerable time is short, sufficient security measure should be made to prevent hackers from getting the data or the key. Second, each time the user sends a request to allow the server to decrypt stored sensitive information, the encryption key (or decryption key if asymmetrical encryption algorithm is used) will transmit from the client computer to the server.

Data transport security can be improved by using protocol, security designs of operation system and application, masking of user identity information, and use of transmission encryption. All communications may use HTTP secure (HTTPS) with transport layer security (TLS), secure sockets layer (SSL), and/or other approaches to creating encrypted channels of communication over all involved networks. File Transfer Protocol (FTP) is a popular method of transferring files between two remote systems. SFTP or Secure File Transfer Protocol, is a separate protocol packaged with SSH that works in a similar way over a secure connection.

All known methods for protecting the key and enhancing encryption key may be used in all application situations. In application settings where data portability is not important, all key stretching, key hashing may be used.

When the internet traffic contains a large number of such transmissions and each key/data travels with very short time, the hacker cannot make a long-term plan to hack a big data system.

4. Data Vulnerability Time Length

As a general rule, the duration of the data existing in a vulnerable state should be minimized. The risk of losing data would depend upon the nature of size and the number of hackers that might attack the site simultaneously.

If the data is used in a computer-operating transaction such as payment, computation, and solving a problem, the data may exist in the vulnerable state only in one to a few seconds. If the data is used in a human review, it might take one hour to several days. It is thus desirable to finish the human review in the shortest times. For a very complexity transaction, user data may be moved onto a computer that is not configured to accept any communications from the internet. In such a system, firewall should be used, all unused ports should be closed, and virus and spamware should be kept off.

5. Selection of Encryption Keys

The user should be advised to have the sole responsibility to securely keep encryption keys permanently. The system may provide help instructions on selecting and securely keeping encryption keys. In most cases, the server is not used for safe-storage of data. If a user relies upon the system for data safety, the user should store the encryption keys in one or more place or firms by special arrangements without disclosing the use.

Data encryption is the last layer of defense that is intended to deprive the hack incentive of "getting one is equal to getting millions." This is the additional defense on top the traditional account authentication method, bidirectional authentication methods, bidirectional encryption methods used in data transmission (transport layer security technologies such as TLS, SSL and S-HTTP are used to prevent random security attacks in transmission). Thus, the last layer of encryption can create a big barrier to hacking. Even if a hacker gets an encrypted data, millions of data pieces are encrypted by millions different keys, the hacker may be unable fare well from such a hacking operation. Since encryption keys are not stored on the server, they may be strings that can be easily remembered. Here are the general guidelines for selecting encryption keys.

First, encryption keys should not be based on personal information such as social security number and birthday directly. Those numbers may be used in combination with other numbers or words. Second, encryption keys should not be associated with personal subjective preference such as favorable numbers, favorable car model because subjective preference may change over time. Third, encryption keys should not be based upon erasable personal memory and instead they must be based upon ascertainable external facts. A reminder that "the place John Doe visited in May 1970" may be a bad choice because John Doe would not be able to remember the trip many years later and there would be nothing left for establishing the place. Fourth, hints for the encryption keys should not be understandable to other persons. "The first house on Red Light Street in Baltimore, Md." may be understandable to any person because one can find the house number. Fifth, the subject matters serving as reminders of encryption keys shall not change over time, or, even if they change, external evidence must be available for establishing the subject matter. Good subjects include house, street number, landmark, and historical major events.

A good reminder may be like the "The house in Arizona in 1980" if the person once lived in the Arizona house for several months in 1980 and it is not a permanent residence and there is no other house the person ever lived in Arizona in his life. This reminder does not reveal the connection between the house and the person, and the connection can be established by the person's unforgettable memory. It is highly unlikely that the person forgets this house completely. Even if the person forgets the house address, the person can establish its address by conducting some investigation because it is impossible that all traces concerning the house is erased from all public records. It is also obvious that a person cannot determine the address of the house from this statement alone and an unrelated person cannot establish this connection.

A personal who has no reason to be a hacking target may use the same encryption key or limited number encryption keys for various transaction systems. For example, the same key may be used to protect data on the account management systems run by a gas company, an electricity company, a water supply company, banks, loan companies, professional trade associations, retailers, government agency, etc. An easier key may be used on email providers such as Google, Yahoo, and LinkedIn. A stronger encryption key may be used in protecting wills, trusts, invention disclosure, trade secret specification file, and personal data.

Using same encryption to protect data in different arrangement should not be a problem because the massive data breaches do not show any pattern of associated data breaches. It is highly unlikely that the hacker cracks multiple systems so that an encryption key found in one system (e.g., Yahoo) can be used in another system (e.g., LinkedIn). Moreover, even if when multiple systems are hacked at nearly same time, finding common accounts between different systems may not be easy. People may use different names, and different people may share a common name.

6. Encryption Key's Storage Location on a Private Client Computer

For all versions of embodiment, user-encryption key may be entered on a user interface page, fetched from a folder location or a device location on the client computer. When the user interface is implemented by using a browser, the key may be stored on cookies (preferably using an innocent name that will not imply an encryption key).

In the preferred embodiment, the server may generate a form which prompts the user to provide the key or designate the location for getting a stored encryption key. In situation where the client computer is controlled or maintained by the user, an automatic-key retrieving method may be used to get the key from the client computer.

One of the methods is prompting the user to select a location to get the encryption key and sending the key to the server for use. The other method is that the server will use a program to find and get the key according to preset key location and search order. Search order may be set up and stored in the user account. Search order is a precedent rule for searching the key in selected folders and key-storing devices.

The encryption key may be stored in a designated key store, a folder, cookies or device. If an encryption key is stored in a USB device, one may need to use a Web USB API or the device's native application for access. Many devices including card reader, scanner may also use USB port. USB square credit card, driver license, security token, fab, etc. may be modified to contain an encryption key. Future driver's license may contain user-writable data. Security tokens may store encryption keys, digital signature, or biometric data. Credit card keypad or similar devices may be used by users to enter PIN or generate encryption keys. Special designs include a USB connector, RFID functions or Bluetooth wireless interface to enable transfer of a generated key to a client computer or the connected server.

Getting the encryption key is only a step of cracking the encryption of the stored data, a hacker would still need to hack into the server to get the stored data in ciphertext and know which encryption key is for which account. In this arrangement, the hacker does not have the benefit of "knowing one account is equal to knowing millions accounts." Thus, hacking John Doe's personal computer or Jack Doe's personal computer is really a bad deal. The effort of getting a personal key may waste time if the hacker never gets the ciphertext from the server. Even if the hacker gets the whole database of ciphertext, the hacker may have a hard time to match data with correct encryption keys.

7. Encryption Algorithms and Applications

Encryption transformations are performed by an encryption algorithm of a cipher, and decryption transformations are performed by a decryption algorithm of the cipher.

The security strength of the invention does not entirely depend upon absolute strength of the encryption algorithm. One key consideration is to remove the huge reward from the large number of cracked user accounts. It is important to create a more chaotic data storage system, where different pieces of user data are encrypted by using different keys and different algorithms. In addition, we also note that data security would depend upon target user identity, nature of incentive, and reward realization. The combination of those factors favor use of a diverse number of encryption algorithms. This will eliminate the incentive that a hacker might get a huge reward by cracking a single encryption scheme.

Encryption application is executed on the server using user's encryption key to encrypt data. The encryption application may employ various cryptographic algorithms such as public-key cryptography, symmetric-key cryptography, hashing, etc. Encryption algorithms include AES, Blowfish, DES, IDEA, and MD5 with different strength. The encryption application may correspond to any available application, library, or module such as ACE, Botan, Bouncy Castle, CryptoComply, Crypto++, GnuTLS, Libgcrypt, Libsodium, Libtomcrypt, NaCL, Nettle, Network Security Service, OpenSSL, SafeZone FIPS Lib, WolfCcrypt, GNU Privacy Guard (GnuPG), Pretty Good Privacy (PGP.RTM.) and so on.

Due to the way of use in the invention, symmetrical encryption algorithms are preferred. If an asymmetrical encryption algorithm is used, the user must use a proper tool to generate both an encryption key and a decryption key. All authorized users must consistently use the encryption key in encrypting user data and authorizing business transactions. None of the keys should be stored on the server. No information should be stored on the server that can be used to generate the encryption key.

In the claimed invention, encryption keys are not stored on the server. Certain key operations including key exchange agreements and public key cryptography standards are not used to encrypt user data for storage purpose, but may be used to improve data transmission security for both the data and the keys.

Moreover, an encryption key for encrypting user data may be encrypted by using a shared secret key, and any known encryption method may be used, as an additional measure to improve key's transmission security. To improve encryption key security, all known methods including password-based encryption, public key encryption, hashing function, using salt, etc. may be used optionally to improve encryption keys that travel between the client computer and the server.

Most encryption modes may be used, including electronic code book (ECB) (observing ECB-encrypted ciphertext can leak information about the plaintext), Cipher Block Chaining (CBC), Cipher Feedback (CFB), Output Feedback (OFB), Counter (CTR), Galois/Counter Mode (GCM), authenticated encryption (CCM, OCB, CWC, EAX, IAPM and OCB), ciphertext stealing mode (CTS). XEX-based tweaked-codebook mode with ciphertext stealing (XTS), Advanced Encryption Standard Key Wrap Algorithm (AES-Wrap), and Stream Cipher (Stream). Moreover, account user may create private encryption algorithms which may use any known or unknown encryption mode.

Block ciphers may be used to further improve data storage security in certain situations. Block ciphers operate on fixed-length groups of bits known as blocks. Where data to be encrypted is longer than a block, the data may be divided into multiple blocks, and each block is separately encrypted. Some exemplary block sizes for a block cipher to operate on include 64 bit (i.e., 8 byte) to 512 bits. Other sized blocks and keys may also be used. Some examples of block ciphers include twofish, blowfish, serpent, data encryption standard (DES), advanced encryption standard (AES), CASTS, international data encryption algorithm (IDEA), etc.

The electronic code book (ECB) is another mode of encryption. The file or data object is divided into blocks and each block is encrypted separately. However, this mode has a disadvantage of identical plaintext blocks being encrypted into identical ciphertext blocks, failing to hide patterns. When a codebook is created, a person can look at the plaintext and the ciphertext and determine what is going on logically. So, parts of the encrypted stream could become visible to an attacker if the attacker knows that this code is encoded with this plain text and can come up with this cipher text with this key. Solution to this problem is known in the art.

Other methods that are known in prior art include a hashed-based cipher-block mode encryption, cipher-block chaining (CBC) mode encryption, a cipher feedback (CFB) mode encryption, etc. Any of those encryption modes may be used in the invention to improve the data security.

Different encryption algorithms with different encryption modes may be used. Users may select different encryption algorithms and may even select different algorithm for different data piece within the user accounts. The server application may use a global variable for storing a list of encryption algorithms and allow user to select a global encryption algorithm for all encryption needs. If the system allows a user to select different encryption algorithms to encrypt different pieces of data, the algorithm name or address must be saved on a specific data fields for setups.

8. Data Storage Locations

Users' data may be stored on a single server, a data storage system connected to the server, stored by splitting a data object and save them on multiple servers.

All encrypted data may be stored in different servers or different data centers to make hacking more difficult. Such a storage method increases difficult degree because a hacker must acquire data from different locations, combine the data pieces properly, and decrypts the data, resulting in usable user data. One disadvantage is that that user data splitting-stored on different servers and data centers is less portable to other systems. However, data portability is unimportant in most application environments if the user data is not stored for sharing purposes. Data storage formats include single string, combined field data with delimiters as separators, any digital files, native files for applications, and any combination thereof.

9. Servers and Client Computers

In each of the arrangements, business transaction is conducted on a server, several connected servers, or a server farm. Thus, it is obvious that all tasks by one single server may be performed by a plurality of servers that are connected permanently or periodically. Thus, it is obvious that a series of functions that can be done by one single server could be delegated to one or more connected servers. A server may include any of the servers as long as they work together to perform the function for intended purposes. The client computer may also be a server as long as it can perform the required functions of a server. A server may also be a client computer as long as it can perform the required functions of a client. A client computer may be any of computers connected to the internet or a private network.

10. Client Encryption and Server Encryption

In the claimed invention, the server must use the user data, and thus using client side encryption will improve data security only by small margins. Encryption of data on the client computer would prevent data from being tampered. When encryption is performed on a client computer, in uploading user data from a client computer, the data is encrypted first and then is uploaded and stored on the server. In contrast, user data is uploaded, encrypted by using an accompanied encryption key, and stored on the server. Client encryption and server encryption are exchangeable and equivalents if they are not expressly claimed.

In authorizing a business transaction, encrypted user data is downloaded to the client computer, decrypted on the client computer by using a user-provided key to generate usable data, and then send the usable data back to the server. Since the user data is exposed in data transmission, the data should be encrypted by using SSL layer in transmission. The encryption for data transmission security must be removed upon data arrival at the server. If encryption for data storage security is performed on the server, the client computer must upload the key for decrypting the data to the server and proceed the rest actions as usual. Both server encryption and client encryption methods can be used. Details are disclosed in U.S. Pat. No. 9,449,183.

However, client encryption can be performed on the encryption key to protect the key, and thus reduce the chance that the key is intercepted in transmission. An easy way of using client encryption is use JavaScript. The web page includes aes.js. It only takes a call like encryptedData=CryptoJS.AES.encrypt (the-encryhption-key-for-the-server, a-shared-secret-key). The first argument to encrypt function is text data to encrypt, e.g. encryption key. The second argument "shared-secret-key" is a secret key that the server must have. The server will need to use the same secret key to generate the usable encryption key.

If the client computer uses key stretching method such as a hashing function or a block cipher, the enhanced key is used in encrypting and decrypting user data. Key stretching may be done at the client computer or the server.

To encrypt any field data on a browser, the encryption function may be triggered by a user action such as a clicking on a button or simply be triggered by a submission action. If data comprises many fields, the data for all fields may be encrypted individually or encrypted as one single data piece after individual data fields are combined with delimiters included.

Obviously, the shared key may be an account password, or a special key that both sides know. Encrypting the encryption key by using the special key is still based upon the trusted relationship model. However, the encryption key exists in a usable form in transmission and on the server for a short time.

By using the same method, the encryption key may be stored in the client computer's key database, a distinctive location or folder on the hard disk, a distinctive folder in a USB drive, and any storage devices that have been known or will be developed in the future. It may be stored on cookies. The encryption key may be encrypted on the client computer by using a shared secret key as long as the secret key can be generated by the server to decrypt the encryption key on the server. To decrypt the encrypted text, the function call is decryptedData=CryptoJS.AES.decrypt (encryptedData, shared-key).

Another simple method is to use hashing function: hashedEncryptionKey=CryptoJS.SHA256(data-to-be-hashed). This function needs to include sha256.js script. The data is the encryption key for encrypting and decrypting user data on the server. While a large number of methods such as using security tokens and adding salts can be added to this step, they are not essential.

A seamless client-side encryption method requires additional support of the browser. Ideally, the request for an encryption algorithm directly causes the server to download an encryption algorithm to the browser, and the encryption algorithm is called by a script. After the user sets up the system with client-side encryption, the browser uses selected encryption algorithm and the user-provided key to encrypt data on the client computer. An encryption operation function may be triggered by a user action or an event on the uploading page.

Browser developers can add more methods for encrypting data. In the alternative, encryption may be performed by Rijndael Encryption Algorithm JavaScript published in 2001. Rijndael Encryption Algorithm in JavaScript is available in both the original version and modified versions. It is wise to do some trials to make sure that a web-based encryption algorithm and the server-based algorithm are completely compatible or common before client encryption is used in a production site.

All known security measures such as transmission security, additional encryption using a shared key or account password, and avoidance of using attention-catching words, chaotic created by large number of traveling encryption keys would be sufficient. A hacker would easily see that a successful hacking operation may be rewarded with little or nothing even if the hacker can intercept an encryption key.

Default encryption machine may be designed by using a setup program, which allows the user to set value for setup data. The setup data may be used for the account. It includes data on encryption machine, default key location on the client. In addition, an encryption mark may be used as an account-wise encryption standard.

10. Use of Hints for the Encryption Key

Another optional feature of the invention is to use a hint or one-way "chain reminder." When the user is prompted to upload user data with an encryption key to the server, the uploading page may contain fields for accepting hints. The user enters a hint "5-31-2006 note." This note's name must be unique. Soon after the user data is successfully uploaded, the user creates a hard copy document titled "5-31-2006 note." This document contains an encryption key without disclosing its use purpose. It is preferable that the document contains an obvious statement that the note should be kept for a certain length of time.

The server application designers and administrators cannot access the hint document due to physical barrier. Potential hackers cannot access this document. The document may be so innocent that there is no conceivable possibility for others to understand. The document may contain two headings and two average passages (actually useless information) to distract attention. Unrelated people, who encounter the note, do not know the connection between the document and the intended use. When the user wants to authorize someone to access encrypted user data, the server prints the hint, "Please enter the encryption key" with "5-31-2006 note" as a hint. The user then finds the note and the key in the note.

In a business setting, lost data in a vast number of situations will not have serious impacts to the user because most personal data, credit card information, medical information, tax information can be reconstructed easily. Thus, use of hints is only for reducing the chance of forgetting encryption key.

In other cases, lost encryption key may have serious adverse impacts on the users. Thus, the user must understand that backup data is not the primary purpose. A user must be careful for protecting the data that (1) is not saved in any other system (2) it cannot be reconstructed from using other sources of information. Generally, extremely few, if any, may fall into this class of data. For this reason, adding this last layer of encryption is very worthwhile.

11. User Accounts

In most business systems, user accounts are used. User accounts like Gmail, Yahoo, LinkedIn, FaceBook, gas bill, water bill, legal professional site, property account, etc. are widely used. They are similar in signing up and confirming the user identity by using email address or calling the user's phone to leave a pin so that the user can use the pin or an email link to activate a newly opened user account. Account is also necessary when multiple users share server resources in conducting business transactions, using system resources for the benefit of the user, and transacting business with other users.

Account is not necessary when server provides services to public members. However, the system has multiple options for changing configuration, encrypting a configuration file or a controlling program can be a means for protecting the system.

In using server resources, user account is not always necessary. In the early state of development, computation services were delivered by using an account number. A real issue to find a way for charging fees for the resources that a user has used. This could be done by using a complex authorization code: only a limited number of all possible numbers will be recognized. The system will provide service only when the submitted page has a right authorization code and denied service when no valid authorization code is provided. Although hackers might attempt try random code to steal services, when the chance of getting right authorization code is very small, no body would waste his time.

Access code may be used if user data is shown with other account user to avoid sending data to a wrong recipient account. An access code may be implemented using a fixed number of characters for authentication purpose.

When user account is used, some inherent functions include changing the account password, changing personal profile, recovering password, and resetting password. Additionally, challenges and questions dialog may be used to ascertain personal identity in the event that a user wants to recover account password.

12. Access User Data by Links

If it is required to share encrypted data with an authorized person, the data may be shared by using global sharing function. The encrypted data is first decrypted by using the user's encryption key. A copy of the usable data is stored in a text file or native file in a temporary storage location such as a shared folder or a shared database table. The file name may be used to create a hash to be used as the identity of the file, or a field name of a data record may be used to generate a hash to be used as the data record identity. A link is then created, which can invoke a download program for downloading the file or accessing the data. The link is then sent to the email address of the intended recipient. The recipient clicks on the link which causes the server to download the file or retrieve the data. The file or data will be deleted as soon as it has been shared, downloaded or read. Note security trust is the hash string that is used to locate the file or database table. To prevent hackers from fishing the file or data from the shared folder or the shared database table, the hash may be the folder name or the database table name so hackers cannot finish unless they know correct hash string.

In an alternative, the usable data to be shared may be encrypted by using a temporary key that can be given to the recipient. When the recipient clinks the link, the server prompt the recipient to provide the temporary encryption key. Upon provision of the key, the server will decrypt the file or data and download the file or data to the client computer. The user can save the file or data or view the data.

The global search function may also allows users to search all data that is designated as global data, download and/or decrypt found data with private keys that the users provide. If user data is not encrypted, anyone can find it, download it, open and read it.

13. Use Database in the Embodiment

The database tables disclosed in this disclosure serve as examples. There are an infinite number of variations in the possible arrangements. For large commercial application, use of database application can improve productivity, but it is not necessary for a small system with a small number of user accounts. All versions of embodiment can be realized by using custom-developed database.

14. Other Preferred Features

The log-out page is modified to include a reminder that the user should not leave any critical information on the computer. This option is useful in cases where the user uses a public or shared computer to access user data.

This log-out page may further ask the user to remove the USB drive or any removable storage device holding the encryption key and delete the encryption key stored in the key location of the client computer. It is preferable to delete the cookies if the client computer is non-private computer.

Choices on the reminder page may be defaulted to deleting the encryption key, but the user may make his choice. On the setup page, the user may be warned that the user should delete the encryption key if the client computer is a shared computer. Optionally, the server can use the session identity to send a page with code for deleting the encryption key in the designated key location right before the session expires. This deletion action may be triggered by time. The browser needs to call a plug-in component for deleting the key if the key is saved on a removal storage media on the client computer.

The invention is intended to encrypt data in a conflict between the need to hide data and the need to use data. It teaches how to encrypt and decrypt user data in the cycles where the precise methods of processing data and nature of transactions are irrelevant. Thus, the invention is intended to cover all application situations where any part of user data is protected by user key.

In those exemplary and preferred embodiments of the present invention, specific components, hardware parts, arrangements, and processes are used to describe the invention. Obvious changes, modifications, and substitutions may be made by those skilled in the art to achieve the same purpose of the invention. The exemplary embodiments are, of course, merely examples and are not intended to limit the scope of the invention. It is intended that the present invention include all other embodiments that are within the scope of the claims and their equivalents.

What is claimed is:

1. A method for protecting user's or owner's data in a system comprising at least one server and at least one client computer in a network or the Internet, the method comprising:

uploading sensitive data from the user, wherein the uploading step further comprises generating a user interface for uploading data together with an encryption key, uploading data with an encryption key to the server, encrypting the part or all of uploaded data on the server by using the accompanied encryption key, and saving the uploaded and encrypted data along with tracking information for the data on the server;

authorizing a business transaction from a client computer, wherein the authorizing step further comprises generating a user interface for getting or uploading an encryption key with information identifying the business transaction to be conducted, rendering the interface on a client computer of the user, getting a user-provided encryption key or getting an encryption key from a designated location of the client computer, sending the encryption key with the information identifying the business transaction to the server, retrieving the encrypted and stored data from the server, and decrypting the retrieved data with the uploaded encryption key on the server to generate usable data; and conducting a business transaction, wherein the step of conducting the business transaction further comprises getting the usable data, using the data to conduct a business transaction on the same server or sending the usable data to a remote server to complete the transaction, preparing a message informing the result of the transaction, and rendering or displaying the message on the client computer for the user.

2. The method of claim 1, wherein the user interface used in the data uploading step accepting a hint for the encryption key, saving the hint on the server for the user, and displaying the hint in the user interface in the transaction-authorizing step so that the user can see the hint.

3. The method of claim 1, wherein the business transaction is making a payment, accessing bank records, accessing credit reports, accessing medical records, accessing personal information, conducting computation, or accessing and processing data in a database.

4. The method of claim 1, further comprising a step of including or adding new data in the authorizing step, wherein the new data is used to replace, amend, or supplement the usable data so that the new data can alter the business transaction done in the transaction step.

5. The method of claim 1, wherein the authorizing step is sending a reply to an instant message on a cellular phone, submitting a web form from a computer, or optionally making a telephone call to provide an encryption key.

6. The method of claim 1, further comprising a step of designating the encryption key location on the client computer or a search order for searching the encryption key, whereby the encryption key can be found in the designated key location or by searching the key in the search order on the client computer.

7. The method of claim 1, further comprising a step of saving the encryption key only on volatile memory on the server for repeated uses wherein the encryption key disappears upon shutting down the server or is deleted after the user's connection is terminated.

8. A method for protecting sensitive user's or owner's data in a system comprising at least one server and at least one client computer in a network or the Internet, the method comprising:

creating a user account for a user so that data can be saved for the user of the account;

uploading user data, wherein the uploading step comprises generating a user interface for uploading data with an encryption key, uploading user-provided data with an encryption key to the server, encrypting at least part of the uploaded data on the server by using the encryption key, and saving the uploaded and encrypted data on the server, or comprises generating a user interface for uploading data, encrypt the data on the client computer, and uploading the encrypted data to the server, and storing the encrypted data on the server, whereby data from different users are encrypted by using different encryption keys and stored in the same database or different databases on the at least one server;

authorizing a business transaction, wherein the authorizing step comprises generating a user interface for uploading an encryption key together with information identifying the business transaction, rendering the user interface on a client computer for the user, getting a user-provided encryption key or getting an encryption key from the client computer, sending the encryption key with the information identifying the business transaction to the server, retrieving the stored encrypted data for the business transaction, and decrypting the retrieved data with the uploaded encryption key on the server to generate usable data, or comprises generating a user interface for downloading encrypted data to the client computer, decrypting the downloaded data using a user-provided key, uploading the resulted usable data to the server, and validating the usable data on the server; and conducting a business transaction, wherein the step of conducting the business transaction further comprises getting the usable data, using the usable data to conduct the business transaction on the same server or sending the usable data to a remote server to complete the transaction, generating a message for informing the result of the transaction, and rendering or showing the message on the client computer.

9. The method of claim 8, wherein the user interface used in the data uploading step accepting a hint for the encryption key, saving the hint on the server for the user, and displaying the hint in the user interface in the transaction-authorizing step so that the hint is clearly visible.

10. The method of claim 8, wherein the business transaction is making a payment, accessing bank records, accessing credit reports, accessing medical records, accessing personal information, conducting computation, and accessing data in a database.

11. The method of claim 8, further comprising a step of including or adding new data in the authorizing step, wherein the new data is used to replace, amend, or supplement the usable data so that the new data alters the business transaction done in the business transaction step.

12. The method of claim 8, wherein the encryption key is gotten from the location designated by the user.

13. The method of claim 8, further comprising a step of designating the encryption key location on the client computer or search order for searching for the encryption key so that the encryption key can be found at a designated key location or by searching for the key by the search order on the client computer.

14. The method of claim 8, further comprising a step of saving the encryption key on volatile memory on the server for repeated uses, wherein the key disappears when the server is shut down, or is deleted after the user's connection is terminated, or after all connections are lost.

15. A method for protecting sensitive data stored in a database on a system comprising at least one server and at least one client computer in a network or the Internet, the method comprising:

creating a plurality of user accounts on the server for conducting at business transaction which is of a type selected from the group consisting of processing a payment, conducting a search, combining data pieces or breaking down data into multiple pieces, and extracting numeric or ASCII values from text;

creating a secured database by each of a plurality of users in the steps of generating a user interface for uploading data with an encryption key, uploading user-provided data with an encryption key to the server, encrypting the data on the server by using the encryption key, and saving the uploaded and encrypted data on the server, or in the alternative steps of generating a user interface for uploading data, encrypt the data on the client computer, and uploading the encrypted data to the server, and storing the encrypted data on the server, wherein the data encrypted by using different encryption keys are stored in the same database or different databases on the servers; and authorizing business transaction by each of the plurality of users by the steps of generating a user interface for uploading an encryption key with information identifying a unique business transaction, rendering the user interface on a client computer for the user, sending the encryption key to the server, retrieving encrypted data from the server for the transaction, decrypting the encrypted data with the uploaded encryption key on the server to generate usable data, or by alternative steps of generating a user interface for downloading encrypted data to the client computer, decrypting the downloaded data using a user-provided encryption key on the client computer, uploading the decrypted data to the server as usable data, wherein, the server uses the usable data to conduct the business transaction, and wherein sensitive data in the plurality of user accounts are encrypted using user-provided different encryption keys, which are not permanently saved on the server.

16. The method of claim 15, further comprising a step of selecting data items to be encrypted and stored in the database in a setup page or a step of changing data items to be encrypted.

17. The method of claim 15, wherein the data used for business transaction is one selected form the group consisting of personal identity data, credit card information, banking account data, user's financial data, personal medical records, transaction history data, personal secrets, documents to be reviewed and processed, and information for solving problems.

18. The method of claim 15, further comprising a step for processing and transforming data, saving the transformed data on the server for the user, and using usable transformed data and/or original data in conducting a business transaction.

19. The method of claim 15, wherein the transformed data is a web page, a text file, delimited text string, a database table, a data extract from a file, transformed file and combination thereof, wherein the transformed data is used in conducting a business transaction.

20. The method of claim 15, wherein the transformed data, original data, and/or newly uploaded data are used in conducting a business transaction.

* * * * *